US012686428B2

(12) United States Patent
Wang et al.

(10) Patent No.: US 12,686,428 B2
(45) Date of Patent: Jul. 21, 2026

(54) WALK-BEHIND CART

(71) Applicant: Greenworks (Jiangsu) Co., Ltd, Jiangsu (CN)

(72) Inventors: Yaoyao Wang, Changzhou (CN); Shouchuan Feng, Changzhou (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 310 days.

(21) Appl. No.: 18/611,751

(22) Filed: Mar. 21, 2024

(65) Prior Publication Data

US 2024/0227901 A1       Jul. 11, 2024

Related U.S. Application Data

(63) Continuation of application No. PCT/CN2022/121221, filed on Sep. 26, 2022.

(30) Foreign Application Priority Data

Sep. 27, 2021    (CN) ........................... 202111141813.9
Sep. 27, 2021    (CN) ........................... 202122353964.2
(Continued)

(51) Int. Cl.
*B62B 5/00*          (2006.01)
*B60Q 9/00*          (2006.01)
(Continued)

(52) U.S. Cl.
CPC .............. *B62B 5/0069* (2013.01); *B60Q 9/00* (2013.01); *B62B 3/001* (2013.01); *B62B 5/004* (2013.01);
(Continued)

(58) Field of Classification Search
CPC ....... B62B 5/0069; B62B 3/001; B62B 5/004; B62B 5/0043; B62B 5/0053; B62B 5/0066; B62B 5/04; B60Q 9/00
See application file for complete search history.

(56) References Cited

U.S. PATENT DOCUMENTS 7,293,619 B2 * 11/2007 Mitchell, Jr. ......... B62B 5/0026
                                                180/19.2
9,827,843 B2 * 11/2017 Block .................... B60B 19/12
                      (Continued)

FOREIGN PATENT DOCUMENTS

CN             2481569 Y        3/2002
CN          202320681 U        7/2012
                  (Continued)

OTHER PUBLICATIONS

International search report of PCT Patent Application No. PCT/CN2022/121221 issued on Nov. 30, 2022.
(Continued)

*Primary Examiner* — Faye M Fleming

(57) ABSTRACT

A walk-behind vehicle includes a vehicle body assembly, a driving wheel, a power assembly, a braking assembly, a control assembly and a power supply device. The driving wheel is connected on the vehicle body assembly. The power assembly is mounted in the driving wheel. The braking assembly is arranged on the driving wheel. The control assembly is arranged on the vehicle body assembly and is electrically coupled to the power assembly and the braking assembly. The power supply device is arranged on the vehicle body assembly and is electrically coupled to the power assembly, the braking assembly and the control assembly. The control assembly includes a steering control device, which is electrically connected with the power assembly in the driving wheel on both sides of the vehicle
(Continued)

body assembly and configured for controlling a steering of the driving wheel on both sides of the vehicle body assembly.

11 Claims, 21 Drawing Sheets

(30) Foreign Application Priority Data

| | | | |
|---|---|---|---|
| Oct. 20, 2021 | (CN) | .......................... | 202111221809.3 |
| Oct. 20, 2021 | (CN) | .......................... | 202111223256.5 |
| Oct. 20, 2021 | (CN) | .......................... | 202122528648.4 |
| Oct. 20, 2021 | (CN) | .......................... | 202122528651.6 |
| Oct. 26, 2021 | (CN) | .......................... | 202111244371.0 |
| Oct. 26, 2021 | (CN) | .......................... | 202122589897.4 |

(51) Int. Cl.
*B62B 3/00* (2006.01)
*B62B 5/04* (2006.01)

(52) U.S. Cl.
CPC .......... *B62B 5/0043* (2013.01); *B62B 5/0053* (2013.01); *B62B 5/0066* (2013.01); *B62B 5/04* (2013.01); *B62B 2005/0471* (2013.01)

(56) References Cited

U.S. PATENT DOCUMENTS

| | | | | |
|---|---|---|---|---|
| 10,731,812 | B2 * | 8/2020 | Nashimoto | ............... B62B 3/12 |
| 11,673,591 | B2 * | 6/2023 | Wang | ...................... B62B 3/007 |
| | | | | 280/651 |
| 11,772,479 | B2 * | 10/2023 | Li | ......................... B60K 17/046 |
| | | | | 180/65.51 |
| 12,371,086 | B2 * | 7/2025 | Huang | ...................... B62B 3/08 |
| 12,479,490 | B2 * | 11/2025 | Shibata | .................. B62D 51/04 |
| 2016/0144709 | A1 | 5/2016 | Block | |
| 2022/0274635 | A1 * | 9/2022 | Zhang | .................. B62B 5/0069 |
| 2025/0010901 | A1 * | 1/2025 | Harada | ...................... B62B 5/06 |

FOREIGN PATENT DOCUMENTS

| | | |
|---|---|---|
| CN | 104843040 A | 8/2015 |
| CN | 206885090 U | 1/2018 |
| CN | 111688786 A | 9/2020 |

OTHER PUBLICATIONS

Extended European Search Report of Counterpart European Patent Application No. 22872182.5 issued on Nov. 28, 2024.

* cited by examiner

WALK-BEHIND CART

CROSS REFERENCE TO RELATED APPLICATION

The present application is a continuation Application of PCT application No. PCT/CN2022/121221 filed on Sep. 26, 2022, which claims the benefit of CN202111141813.9 filed on Sep. 27, 2021, CN202122353964.2 filed on Sep. 27, 2021, CN202111223256.5 filed on Oct. 20, 2021, CN202122528648.4 filed on Oct. 20, 2021, CN202111221809.3 filed on Oct. 20, 2021, CN202122528651.6 filed on Oct. 20, 2021, CN202111244371.0 filed on Oct. 26, 2021, and CN202122589897.4 filed on Oct. 26, 2021. All the above are hereby incorporated by reference for all purposes.

TECHNICAL FIELD

The disclosure relates to a technical filed of garden tools, in particular to a walk-behind cart.

BACKGROUND

The walk-behind cart is a more frequent and indispensable tool used in life, which is mainly used for a short-distance transportation of goods. In modern life, we need to use varieties of kinds of walk-behind carts, such as for a service staff in the hotel to load garbage or to change sheets, covers and sundries of the guest, or for the workers on the construction site to load yellow sand, cement, bricks, etc., so these walk-behind carts greatly facilitate our life.

Currently, due to the development trend of electrification, varieties of kinds of walk-behind carts are upgraded to electric walk-behind carts, thereby reducing people's work intensity. Its self-propelled driving system usually adopts wheel hub self-propelled motors. Most of the driving motors of the electric walk-behind carts on the market adopt a single-side shaft fixation method. All the loads are concentrated on the single-side shaft, and the single-side bearing is subject to torque. If it is a large load, the requirements of the motor output shaft and the whole machine assembly are very high. In addition, the driving motor shafts adopted by the electric scooter on the market and some flatbed scooters are double-side shaft, but the motor and the fixing bracket for mounting the wheel body are located below the whole bearing chassis. If the wheel size is large, the bearing chassis will become higher, which may result in a higher load-bearing center of gravity, and the overall stability is not good.

In addition, the walk-behind cart on the market usually includes parts such as a wagon box, a frame, a handle and a universal wheel, but some of the conventional walk-behind carts on the market have no braking mechanism. This kind of walk-behind cart used in some conditions in life will be dangerous, such as when the walk-behind cart is loaded with heavy objects and walked on a sloped road, the user may be exhausted or accidentally falls, or when the battery pack is low on power, or an acquaintance accidentally lets go of the walk-behind cart while chatting, the walk-behind cart may roll backwards out of control, which may cause damage to property and personal safety.

In addition, another part of the conventional walk-behind cart on the market contains a braking mechanism, but when the traditional braking mechanism the walk-behind cart is applied to the electric walk-behind cart, there is no control device regulation between the braking mechanism and the driving device, which may cause the braking mechanism and the driving device running at the same time. This may greatly reduce the braking performance of the braking mechanism, and in serious cases, may cause the braking mechanism to fail, and a serious accident occurs, which may cause injury to property and personal safety.

In addition, these walk-behind carts on the market basically do not have the function of being able to control the steering, which can only rely on manpower lateral force to promote the rotation of universal wheels and achieve the purpose of steering. However, when the walk-behind cart is loaded with heavy objects, it requires a lot of force to turn, which may easily make people feel tired. Or in a relatively small space, manual lateral force is used to push the walk-behind cart to turn. Sometimes the force is not accurately controlled, and the walk-behind cart cannot smoothly turn to the required angle, and repeated adjustments are required, which is time-consuming and labor-intensive.

SUMMARY

The disclosure provides a walk-behind cart. The walk-behind cart includes a vehicle body assembly, a driving wheel, a power assembly, a braking assembly, a control assembly and a power supply device.

The driving wheel is connected with the vehicle body assembly through a wheel axle and is capable of rotating around the wheel axle.

The power assembly is mounted in a wheel hub of the driving wheel and drives the driving wheel to rotate.

The braking assembly is partially arranged in the driving wheel for braking of the driving wheel.

The control assembly is arranged on the vehicle body assembly and electrically coupled to the power assembly and the braking assembly.

The power supply device is arranged on the vehicle body assembly and electrically coupled to the power assembly, the braking assembly and the control assembly.

Wherein, the control assembly includes a steering control device, the steering control device is electrically connected with the power assembly in the driving wheel on both sides of the vehicle body assembly and is used for controlling a steering of the driving wheel on both sides of the vehicle body assembly, the steering control device includes a bracket and a steering switch, a control panel is mounted in the bracket, the steering switch is mounted on the bracket and is connected with the control panel, and the steering switch controls the steering of the driving wheels on both sides of the vehicle body assembly.

In an embodiment of the disclosure, the steering control device includes a steering handle, a main switch, a return spring and a pressing plate.

The steering handle is connected with the bracket through a rotating shaft.

The main switch is mounted inside the bracket, connected with the control panel and controlled through the steering handle.

The return spring is sleeved on the rotating shaft.

The pressing plate is fixedly connected with the bracket to fix the steering switch.

In an embodiment of the disclosure, the control panel is provided with three different gears which are a left turn gear, a middle gear and a right turn gear, and the three different gears are controlled by the steering switch.

3

In an embodiment of the disclosure, the control panel is further provided with at least one indication light, and the indication light is configured to indicate a state of the steering switch.

In an embodiment of the disclosure, the control panel is further provided with three indication lights corresponding to the three different gears: the left turn gear, the middle gear and the right turn gear.

In an embodiment of the disclosure, the walk-behind cart further includes the pressing plate, the pressing plate is fixedly connected with the bracket by welding or a buckle to fix the steering switch, and the indication light is mounted on the pressing plate.

In an embodiment of the disclosure, a control box is further mounted on a frame of the vehicle body assembly, and the control box is electrically connected with the steering control device through a signal line.

In an embodiment of the disclosure, the power assembly includes a hub motor, and the hub motor is arranged in the wheel hub of the driving wheel.

In an embodiment of the disclosure, the braking assembly includes a first driving component, a braking pad and an operation assembly.

The first driving component is fixedly connected with the vehicle body assembly.

a braking pad, connected with the first driving component; and an operation assembly, mounted on the frame, and comprising a second driving component and a braking handle, wherein, the second driving component is connected with the first driving component through a hydraulic oil tube, the braking handle is mounted on the second driving component, when braking, the braking handle pushes hydraulic oil in the second driving component to be squeezed into the first driving component along the hydraulic oil tube, thereby pushing the braking pad, so that the braking pad contacts and squeezes a brake disc, and the brake disc is fixedly connected with the wheel hub of the driving wheel.

In an embodiment of the disclosure, the braking assembly includes a first braking component and a second braking component.

The first braking component is fixed at the driving wheel to realize a braking of the driving wheel.

a second braking component, fixed on a handle of the vehicle body assembly, connected with the first braking component through a cable, and electrically connected with a control device through a signal line; wherein When the braking assembly is in a braking state, a control connection between the control device and the power assembly is disconnected.

In an embodiment of the disclosure, the power supply device includes a battery box, a battery pack cavity, a battery pack and a power cable.

a battery box, fixed on a handle of the vehicle body assembly;

The battery pack cavity is formed in the battery box.

The battery pack is detachably fixed in the battery pack cavity.

The power cable is electrically connected with hub motors in the battery pack and the power assembly.

In an embodiment of the disclosure, the vehicle body assembly includes a frame and a wagon box, the wagon box is fixed on the frame, and the frame includes a supporting bracket and a fixing frame.

The supporting bracket is fixed at a bottom of the wagon box and supports the wagon box.

The fixing frame is fixedly connected with the supporting bracket and configured to mount the driving wheel.

The wheel axles on both sides of the driving wheel are fixedly connected with the fixing frame.

The disclosure further provides a walk-behind cart. The walk-behind cart includes a frame, a power supply device and a control assembly.

A first hub motor and a second hub motor are mounted in driving wheels on two sides of a bottom of the frame respectively.

The power supply device is mounted on the frame.

The control assembly includes a steering control device. The steering control device is mounted on the frame, electrically connected with the first hub motor and the second hub motor and is used for controlling a steering of the first hub motor and the second hub motor. The steering control device includes a bracket and a steering switch. A control panel is mounted in the bracket. The steering switch is mounted on the bracket and is connected with the control panel, and the steering switch controls the steering of the first hub motor and the second hub motor.

Wherein, the walk-behind cart is provided with three different gears of a left-turn gear, a middle gear and a right-turn gear, and is controlled by the steering switch. When the walk-behind cart is in the left-turn gear, the first hub motor rotates forward at a constant speed at a set speed, and the second hub motor rotates at a same speed in an opposite direction to the first hub motor. When the walk-behind cart is in the middle gear, the first hub motor and the second hub motor rotate in the same direction. When the walk-behind cart is in the right-turn gear, the second hub motor rotates forward at a constant speed at a set speed, and the first hub motor rotates at the same speed in the opposite direction to the second hub motor.

In an embodiment of the disclosure, when the walk-behind cart suddenly needs to steer in a driving process of a normal operation state, after the steering switch is pressed to the left turn gear or the right turn gear, a control box on the walk-behind cart first enables the first hub motor and the second hub motor to power off and stop running at this time, and when the walk-behind cart is completely stopped, then a steering function is performed.

In an embodiment of the disclosure, two sides of a bottom of the frame are symmetrically provided with a bearing base respectively. The bearing bases on two sides are respectively provided with the driving wheel and the braking assembly, and the operation assembly is connected with the first driving component in the braking assembly on both sides respectively through two hydraulic oil tubes.

In an embodiment of the disclosure, the driving wheel is fixedly connected with the bearing base through the rotating shaft, and the hub motor and the brake disc are arranged on the rotating shaft.

In an embodiment of the disclosure, an end of the rotating shaft connected with the bearing base is provided with a flat groove, the rotating shaft is fixedly connected with the bearing base through the pressing plate, and the pressing plate is located at the flat groove.

In an embodiment of the disclosure, the first driving component includes a housing and a piston arranged in the housing. The housing is provided with an oil inlet, the oil inlet is connected with the hydraulic oil tube, and the hydraulic oil enters the housing along the oil inlet to push the piston.

In an embodiment of the disclosure, the braking pad includes a first braking pad and a second braking pad. The first braking pad is fixedly connected with the piston, and the second braking pad is fixedly connected with the housing.

In an embodiment of the disclosure, the brake disc is located between the first braking pad and the second braking pad.

In an embodiment of the disclosure, the second driving component includes an oil casing, an oil tube screw is located in the oil casing and forms an oil storage cavity with the oil casing. The oil storage cavity is communicated with an oil storage cavity of the first driving component through the hydraulic oil tube.

In an embodiment of the disclosure, the braking handle is rotatably connected with the oil casing through a rotation shaft, and the rotation shaft is sleeved with a return spring.

In an embodiment of the disclosure, a bottom of the second driving component is provided with a switch, and the switch is connected with the control box on the frame through the signal line.

In an embodiment of the disclosure, the braking handle includes a holding part, a braking part and a switch triggering part, the braking part and the switch triggering part are located at a same end of the holding part, and there is an angle between the switch triggering part and the braking part.

In an embodiment of the disclosure, the braking part is used for pushing the oil tube screw in the second driving component to move, and the switch triggering part is used for controlling an on-off of the switch.

In an embodiment of the disclosure, the frame further includes the handle, and the control box and the operation assembly are both mounted on the handle.

In an embodiment of the disclosure, the first braking component includes a brake drum, a brake cover, at least two brake shoes, at least two braking pads, an adjustment rod and an adjustment bracket.

The brake drum is coaxially fixed with the wheel hub of the driving wheel and forms an accommodating cavity.

The brake cover is fixedly connected with the vehicle body assembly and closes an opening of the accommodating cavity.

The at least two brake shoes are removably connected with the brake cover, an elastic component is arranged between the two brake shoes, and the two brake shoes are elastically connected with each other through the elastic component.

The at least two braking pads are attached to a surface of the brake shoe and correspond to an inner wall of the accommodation cavity.

A first end of the adjustment rod is clamped between two brake shoes, and a second end of the adjustment rod passes through the brake cover and is rotatably connected with the brake cover.

A first end of the adjustment bracket is fixedly connected with the adjustment rod, and a second end of the adjustment bracket is in a transmission connection with the second braking component through a cable.

In an embodiment of the disclosure, the elastic component includes a tension spring.

Two ends of the tension spring are respectively hooked with connecting holes at a same end of the two brake shoes.

In an embodiment of the disclosure, the cable connected with the adjustment bracket is sleeved with a line tube, a block is fixed at one end of the line tube close to the adjustment bracket, and the block is fixed with the frame in the vehicle body assembly.

In an embodiment of the disclosure, the cable connected with the adjustment bracket is sleeved with a first return spring. The first return spring is located between the block and the adjustment bracket.

In an embodiment of the disclosure, the second braking component includes a mounting sleeve, a braking handle, a cable, a braking switch and a signal line.

The mounting sleeve is sleeved on the handle in the vehicle body assembly.

The braking handle is rotatably connected with the mounting sleeve through the rotating shaft.

A first end of the cable is fixedly connected with the braking handle, and a second end of the cable is fixedly connected with the adjustment bracket.

The braking switch is fixed on the mounting sleeve and linked with the braking handle to realize an on-off of the braking switch.

The signal line is electrically connected with the braking switch and the control device.

In an embodiment of the disclosure, the rotating shaft of the braking handle connected with the mounting sleeve is sleeved with a second return spring.

In an embodiment of the disclosure, there are two cables on the braking handle and they correspond to the first braking component and second braking component one-to-one.

In an embodiment of the disclosure, the bottom of the frame is fixed with a universal wheel.

In an embodiment of the disclosure, a cavity is formed in the wheel hub of the driving wheel and is used to mount the power assembly and the first braking component.

In an embodiment of the disclosure, the power assembly includes the hub motor.

The hub motor is mounted in the cavity on the driving wheel.

Two ends of a wheel axle in the hub motor pass through and are arranged at a waist-shaped groove of the frame, and are fixedly connected with the frame.

A rotor core of the hub motor is fixedly connected with a side wall of the cavity.

A connection of the wheel axle of the hub motor and the frame is provided with a positioning assembly.

In an embodiment of the disclosure, the positioning assembly includes a positioning washer and a fixing nut.

The positioning washer coaxially passes through and is arranged at two ends of the wheel axle of the hub motor, a boss is formed on the positioning washer, and the boss is embedded in the waist-shaped groove of the frame.

The fixing nut is threadedly connected with the two ends of the wheel axle of the hub motor.

In an embodiment of the disclosure, the fixing frame includes two groups of the side plates and a connecting rod.

The two groups of the side plates are fixedly connected with two sides of the supporting bracket, and the two ends of the wheel axle are fixedly connected with the corresponding side plates.

The connecting rods are sequentially connected with the two groups of the side plates.

The two groups of the side plates form a frame-shaped structure with the connecting rod, and the connecting rod is located below the supporting bracket.

In an embodiment of the disclosure, each group of side plates includes at least two side plates, and the two side plates are located on two sides of the driving wheel in an axial direction thereof.

In an embodiment of the disclosure, each side plate is provided with a waist-shaped groove, and an opening is arranged in an edge position of each side plate. The opening is communicated with the waist-shaped groove, and the wheel axle is arranged in the waist-shaped groove through the opening, and is embedded and matched with the waist-shaped groove.

In an embodiment of the disclosure, a length of the waist-shaped groove is greater than a diameter of the opening.

In an embodiment of the disclosure, flat shafts are formed at both ends of the wheel axle, and the positioning assembly is arranged on the flat shaft for fixedly connecting the flat shaft and the side plate.

In an embodiment of the disclosure, a length of a cross-section of the flat shaft is greater than the diameter of the opening and is less than a length of the waist-shaped groove.

In an embodiment of the disclosure, the positioning assembly includes the positioning washer and the fixing nut.

The positioning washer coaxially passes through and is arranged at two ends of the wheel axle, the boss is formed on the positioning washer, and the boss is embedded in the waist-shaped groove and the flat shaft is pressed against the waist-shaped groove.

The fixing nut is threadedly connected with the two ends of the wheel axle.

In an embodiment of the disclosure, there are two connecting rods, and the two connecting rods are located on two sides of a vertical axial direction of the driving wheel and are respectively connected with the two ends of a plurality of the side plates.

In an embodiment of the disclosure, the supporting bracket includes a horizontal plate and a vertical rod.

The horizontal plate is fixedly connected with a bottom of the wagon box.

The vertical rod is fixed at two ends of the horizontal plate.

In an embodiment of the disclosure, the bottom of the wagon box is provided with a groove, and the vertical rod is arranged in the groove.

The disclosure provides the walk-behind cart. The walk-behind cart satisfies a mounting and fixation of large-size wheels by mounting the driving wheels in the fixed frame, so that a high-power power device is conveniently mounted in a hub of the large-size wheels, so as to meet a demand for power of the electric walk-behind cart.

The disclosure provides the walk-behind cart. The walk-behind cart may effectively distribute load on the side plates on two sides of the wheel axle by an assembly mode that both ends of the wheel axle are fixed with the side plate, which may bear a transportation of large load, and improves an installation firmness and a bearing performance of the driving wheel.

The disclosure provides the walk-behind cart. The walk-behind cart is provided with a universal wheel mounted at the rear of the supporting bracket and the driving wheel mounted in the fixing frame, thereby adjusting a load-bearing center of gravity of a bearing bracket and avoiding a center of gravity of the chassis becoming higher due to a replacement of wheels with larger-size wheels, which effectively improves an overall stability of the electric walk-behind cart.

The walk-behind cart of the disclosure provides the control device electrically connected with the second braking component through the signal line, so that when the braking assembly is in a braking state, a control connection between the control device and the power assembly is disconnected, and a braking performance and braking safety of the braking assembly may be effectively improved.

The walk-behind cart of the disclosure may control the first braking components on the two driving wheels through only one second braking component, which may enable the two driving wheels to brake simultaneously, improve a braking timeliness and safety, further improve an integration of the braking assembly, and reduce a number of parts of the braking assembly and production cost.

According to the walk-behind cart of the disclosure, each of the two driving wheels is provided with the hub motor, and the two hub motors are controlled simultaneously by the control device, which may realize a simultaneous operation of the two driving wheels, and improve a dynamic performance of driving wheels and a stability in an operation of a vehicle body. The first braking components are mounted on both the two driving wheels, which may realize a simultaneous braking of the two driving wheels, brake quickly, and a phenomenon of side slipping will not occur, so that the walk-behind cart runs more safely.

The walk-behind cart of the disclosure is provided with the braking assembly respectively on both sides of the bottom of the frame to avoid that when the walk-behind cart is loaded with heavy objects and walks on a road surface with slopes, a user is exhausted or accidentally falls, or when the battery pack is insufficient, etc., the walk-behind cart may slip backwards and out of control, which may avoid injury to property and personal safety.

The walk-behind cart of the disclosure controls two braking assemblies simultaneously through one operation assembly, so that their operation is more convenient, and two wheels may brake at the same time, which may realize a rapid braking, and avoid the phenomenon of side slip when braking, and a running process of the walk-behind cart is safer.

The walk-behind cart of the disclosure forms a linkage with the braking process of the walk-behind cart by setting the switch, and when braking, a control effect of the control box on an on-off of the walk-behind cart is temporarily disconnected, so as to avoid an occurrence of accidental touch, thereby causing danger.

The walk-behind cart of the disclosure controls the steering of the first hub motor and the second hub motor at the bottom of the frame respectively through the control assembly. When the walk-behind cart needs to be steered, the first hub motor and the second hub motor are controlled by the control assembly to rotate in the opposite directions at the same speed, so that the walk-behind cart achieves a purpose of turning in situ, which avoid that when the walk-behind cart is loaded with heavy objects, it is necessary to push with great force. This is easy to enable the user to feel tired. And in a relatively narrow space, manpower is relied to exert a lateral force to push the walk-behind cart to steer, a strength is sometimes inaccurate, the walk-behind cart cannot smoothly turn to the required angle, and a problem of time-consuming and labor-consuming needed to be repeatedly adjusted is avoided, which enables the steering of the walk-behind cart to be convenient and labor-saving, and enables the walk-behind cart to quickly and conveniently realize the steering function under a condition of the narrow space or full of heavy objects.

DETAILED DESCRIPTION

Figure 1:
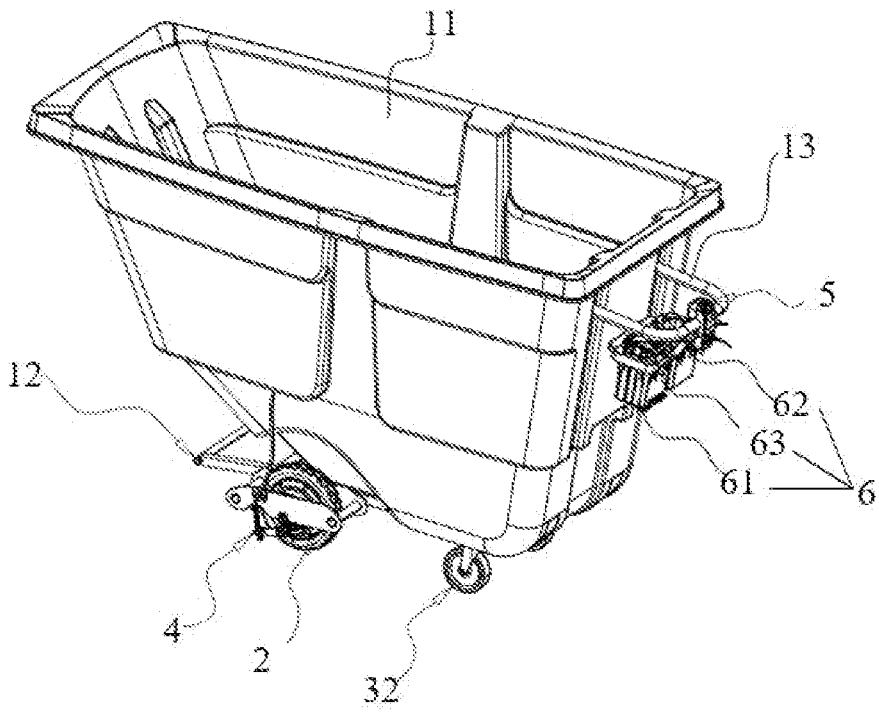
FIG. 1 is an isometric view of a walk-behind cart according to at least one embodiment.

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure. It should be noted that, the following embodiments and the features in the embodiments can be combined with each other without conflict. It should further be understood that the terms used in the examples of the disclosure are used to describe specific embodiments, instead of limiting the protection scope of the disclosure. The test methods that do not indicate specific conditions in the following examples are usually in accordance with conventional conditions, or conditions recommended by each manufacturer.

Please refer to FIG. 1 through FIG. 38. It should be noted that the structure, proportion, size, etc. shown in the drawings attached to this specification are only used to cooperate with the contents disclosed in the description for the understanding and reading of persons familiar with the technology, and are not used to limit the limitations that may be implemented by the disclosure, so there is no technical substantive significance. Any structural modifications, changes in proportion, or adjustments in size should still fall within the scope of the technical content disclosed in the disclosure without affecting the effectiveness and purpose of the disclosure. It should be noted that the terms such as "upper", "lower", "left", "right", "middle" and "a/an" cited in this specification are only for the convenience of description and are not used to limit the scope of the disclosure. The change or adjustment of the relative relationship should also be regarded as the applicable scope of the disclosure without substantial change in the technical content.

Figure 2:
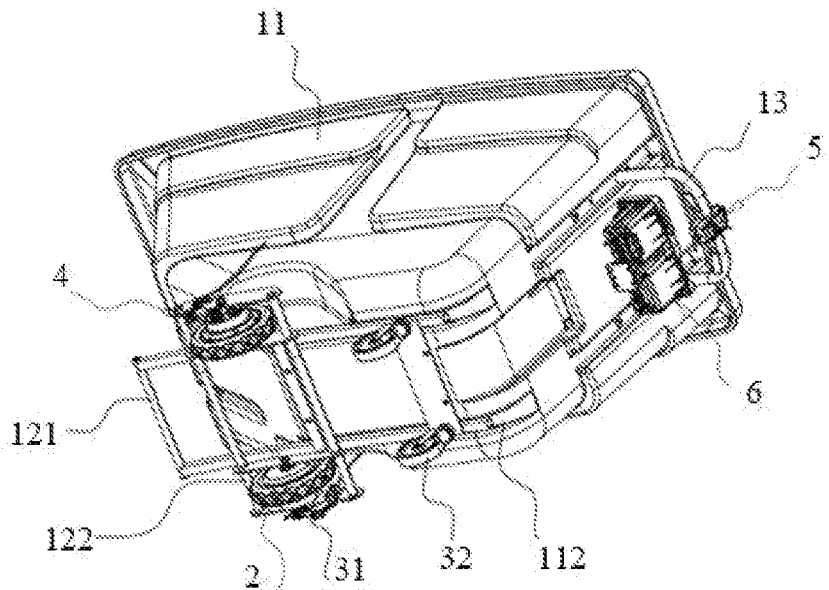
FIG. 2 is a schematic view of a bottom of a wagon box according to at least one embodiment.

Please refer to FIG. 1 and FIG. 2. The disclosure provides an electric walk-behind cart. The walk-behind cart includes a vehicle body assembly, driving wheels, a power assembly 2, a braking assembly 4, a control assembly 5 and a power supply device 6. Wherein, the driving wheels are mounted on the vehicle body assembly through a wheel axle. The driving wheels can rotate around the wheel axle. The power assembly is mounted in a wheel hub of the driving wheel to drive the driving wheel to rotate. The braking assembly is arranged on the driving wheel for braking of the driving wheel. The control assembly is arranged on the vehicle body assembly and is electrically coupled to the power assembly and the braking assembly to control the power assembly and the braking assembly. And the power supply device is mounted on the vehicle body assembly and is electrically coupled to the power assembly, the braking assembly and the control assembly.

Please refer to FIG. 1 and FIG. 2. In this embodiment, the wagon box may be loaded with waste produced in a garden operation or tools required in an operation, and it should be noted that the electric walk-behind cart mentioned in the disclosure may not only be used in the garden operation but also may be used in other engineering fields. A bottom of the wagon box is fixedly connected with a bearing bracket by bolts, and the bearing bracket may play a supporting role for the wagon box, and also provides mounting conditions for wheels, a power device and a braking device. A handle is fixed on a side wall of the wagon box, and the handle is located at an upper position of the side wall of the wagon box. A shape of the handle is a U-shaped rod, and two ends of the handle are fixed on the side wall of the wagon box through the bolts. In addition, the control device is mounted on the handle for easy operation.

Figures 7, 8:
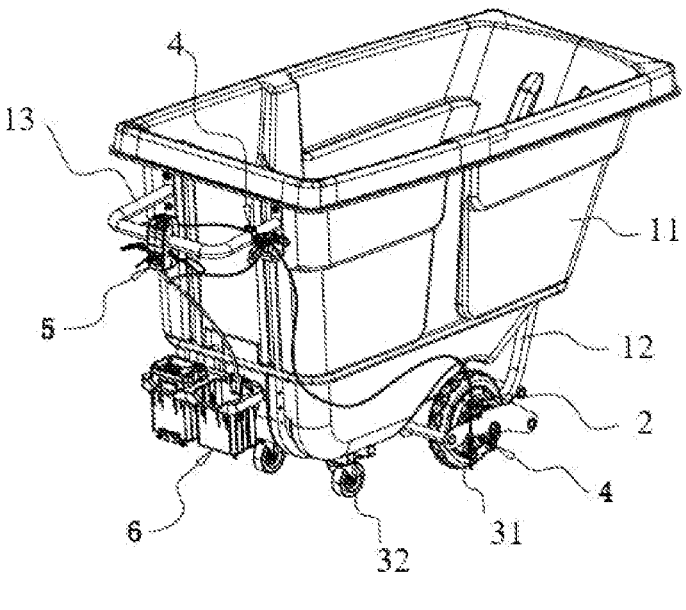
FIG. 7 is a second isometric view of a walk-behind cart according to at least one embodiment.
FIG. 8 is a schematic structural view of a handle according to at least one embodiment.

Please refer to FIG. 1, FIG. 2 and FIG. 8. In this embodiment, the vehicle body assembly includes the wagon box 11, the frame 12 and the handle 13. The bottom of the wagon box 11 is fixedly connected with the frame 12 through the bolts, the frame 12 may supports the wagon box 11, and also provides mounting conditions for a wheel assembly 1, the power assembly 2, the braking assembly 4, the control assembly 5 and the power supply device 6. The shape of the handle 13 is a U-shaped rod, two ends of the handle 13 are fixed on the side wall of the wagon box 11 through the bolts, and two connections of the handle 13 and the wagon box 11 are formed with hooks 124. In addition, both the control assembly 5 and part of the braking assembly 4 are mounted on the handle 13 for easy operation.

Figure 3:
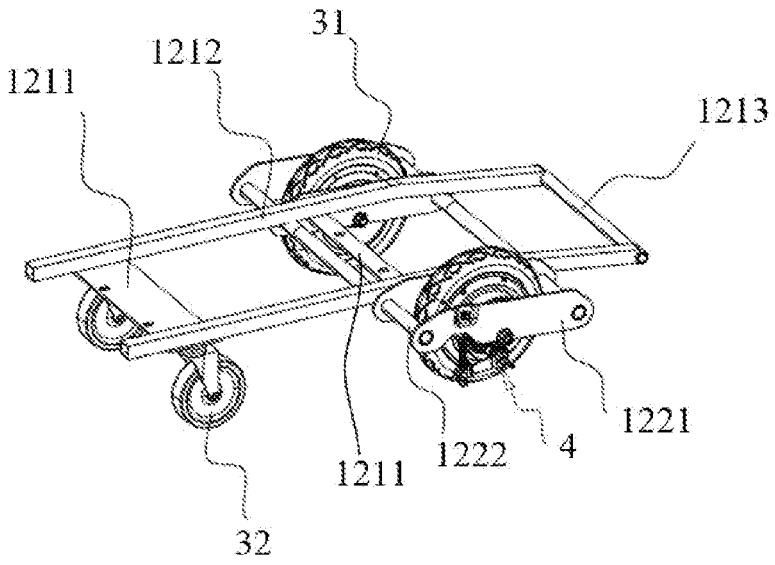
FIG. 3 is a schematic structural view of a bearing bracket according to at least one embodiment.

Please refer to FIG. 3. In this embodiment, a bottom of the vehicle body assembly is further provided with a universal wheel 32. The driving wheel 31 and the universal wheel 32 are both arranged at a bottom of the frame 12, the driving wheel 31 is connected with the frame 12 through the wheel axle 1311, the driving wheel 31 rotates around the wheel axle 1311, and the wheel axle 1311 is located on an axis of the driving wheel 31. Wherein, the power assembly is mounted in the wheel hub of the driving wheel 31, the driving wheel 31 is used as a front wheel of a whole wheel 3, and the universal wheel 32 is used as a rear wheel of the whole wheel 3. A mounting mode of the front driving wheel and the rear steering wheel enables the electric walk-behind cart to have advantages of high rotation efficiency and sensitive steering. The driving wheel 31 and the universal wheel 32 are symmetrically arranged at the bottom of the frame 12, and a four-wheel structure is adopted, so that a balance and stability of the walk-behind cart may be effectively guaranteed.

Please refer to FIG. 2 and FIG. 3. In this embodiment, the frame 12 includes a supporting bracket 121 and a fixing frame 122. Wherein, the supporting bracket 121 includes a horizontal plate 1211 and a vertical rod 1212. The horizontal plate 1211 is fixed at the bottom of the wagon box 11 through the bolts. It should be noted that two horizontal plates 1211 are arranged at intervals along a length direction of the wagon box 11. The two horizontal plates 1211 are respectively located at two ends of the bottom of the wagon box 11 along a length direction thereof, the universal wheels 32 are arranged on the horizontal plates 1211 located at a rear of the wagon box 11, and the two universal wheels 32 are respectively fixed at two ends of the horizontal plates 1211 in a length direction. There are two vertical rods 1212, the two vertical rods 1212 are respectively fixed at two ends of the horizontal plates 1211, and connected sequentially with the two horizontal plates 1211. The vertical rod 1212 is bent to a front end of the wagon box 11 and is bent towards a ground, and a bent end of the two vertical rods 1212 is connected with each other through a cross rod 1213, so as to form a stable frame-shaped structure. In addition, grooves 112 are formed in the bottom of wagon box 11, and the grooves 112 are located on both sides of the wagon box 11 along a width direction thereof, and extends along a length direction of wagon box 11. And the grooves 112 correspond one-to-one with the vertical rods 1212. A straight section of the vertical rod 1212 is embedded in the groove 112, so that a position of the vertical rod 1212 may be restricted, and a stability of mounting the supporting bracket 21 is further increased.

Please refer to FIG. 2 and FIG. 3. The fixing frame 122 is fixedly connected with the supporting bracket 121, corresponds to a front end position of the wagon box 11, used to mount the driving wheel 31 and includes a side plate 1221 and a connecting rod 1222. Wherein, the side plates 1221 are provided with two groups in this embodiment, and the side plates 1221 are arranged along a length direction of the vertical rod 1212. Each group of side plates 1221 corresponds to one driving wheel 31, and each group of side plates 1221 includes two side plates 1221. A driving wheel mounting position (not indicated in the figure) is formed between every two side plates 1221, and the two driving wheel mounting positions correspond to two sides of the wagon box 11 in the width direction of the wagon box 11. The two driving wheels 31 are arranged in the corresponding mounting positions (which means that the driving wheels 31 are located between the two side plates 1221 in each group), the side plate 1221 in each group is fixedly connected with two vertical rods 1212 respectively, and the two side plates 1221 are respectively located on two sides of the two vertical rods 1212 facing away from each other. There are two connecting rods 1222 in this embodiment, the connecting rods 1222 pass through the four side plates 1221 in turn, and fixedly connect the four side plates 1221, and the two connecting rods 1222 are respectively located at two ends of the side plates 1221 along its length direction (which means that the two connecting rods 1222 are located at front and rear sides of the driving wheels 31 along its travel direction. The frame-shaped structure is formed through the four side plates 1221 and the two connecting rods 1222, so that the fixing frame 122 has a higher structural strength and may bear larger torque when the driving wheels 31 rotates, which improves a stability of an overall structure.

Figure 4:
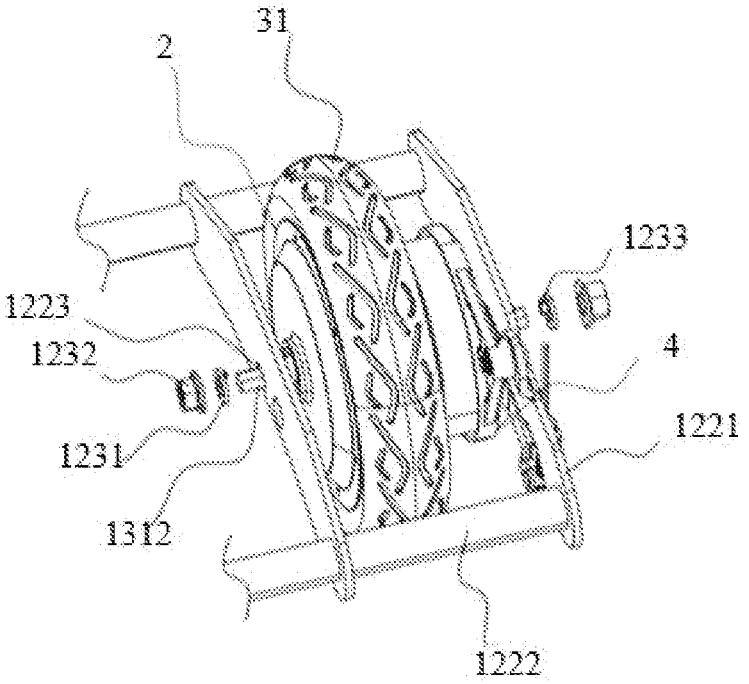
FIG. 4 is a schematic exploded view of a positioning assembly according to at least one embodiment.
Figure 5:
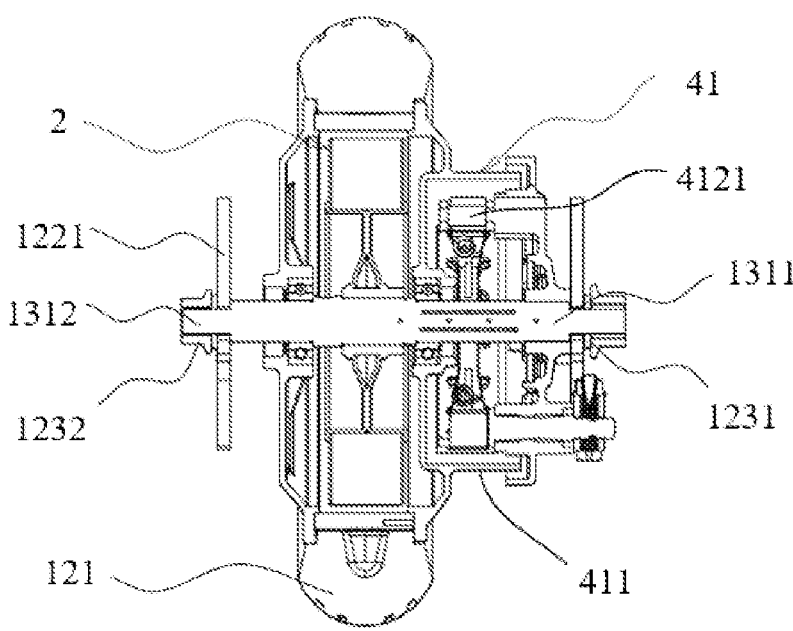
FIG. 5 is a cross-sectional view of a driving wheel according to at least one embodiment.
Figure 6:
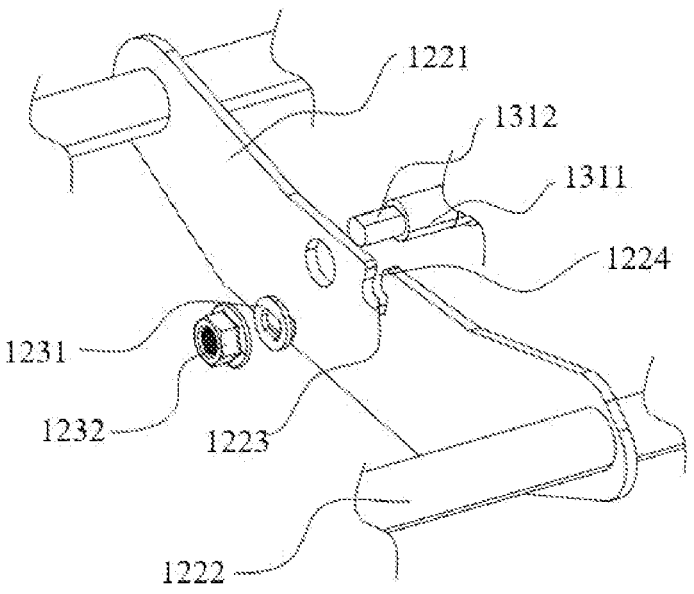
FIG. 6 is a schematic assembly view of a wheel axle and a side plate according to at least one embodiment.

Please refer to FIG. 4, FIG. 5 and FIG. 6. In this embodiment, each side plate 1221 is provided with a waist-shaped groove 1223, and an opening 1224 is formed in an edge position of each side plate 1221. The opening 1224 on each side plate 1221 is communicated with the waist-shaped groove 1223 on the side plate 1221, a length of the opening 1224 is smaller than a length of the waist-shaped groove 1223, and the wheel axle 1311 is placed in the waist-shaped groove 1223 through the opening 1224. It should be noted that an axis of the waist-shaped groove 1223 on each side plate 1221 is located on a same straight line, and the wheel axle 1311 is placed in the waist-shaped groove 1223 through the opening 1224, and is clamped and fixed with the waist-shaped groove 1223, so that a mounting and fixation of the driving wheel 31 is realized. A mounting position of the two driving wheels 31 is symmetrical, and an overall stability of the electric walk-behind cart may be improved.

Please refer to FIG. 4, FIG. 5 and FIG. 6. In this embodiment, two ends of the wheel axle 1311 are coaxially formed with a flat shaft 1312, and a length of a cross section of the flat shaft 1312 is greater than a depth of the opening 1224, and less than the length of the waist-shaped groove 1223. The two flat shafts 1312 are sleeved with positioning assemblies 123 for fixedly connecting the flat shaft 1312 with the side plate 1221 for stable mounting of the driving wheel 31. In addition, through an assembly mode that the two ends of the wheel axle 1311 are fixed with the side plates 1221, a load may be effectively distributed on the side plates 1211 on the two sides of the wheel axle 1311, which may bear a transportation of large load. Compared with a unilateral fixation method of the wheel axle, the wheel axle 1311 in the disclosure may bear a larger torque and also reduces requirements for an assembly of the whole machine.

Please refer to FIG. 4, FIG. 5 and FIG. 6. In this embodiment, the positioning assembly 123 includes a positioning washer 1231 and a fixing nut 1232. The positioning washer 1231 is coaxial provided with a through-hole structure, so that the positioning washer 1231 is conveniently penetrated at the two ends of the wheel axle 1311 and is located at two sides of the two side plates 1221 away from each other in a group of side plates 1221. The positioning washer 1231 is integrally formed with a boss 1233, the boss 1233 is embedded in the waist-shaped groove 1223, and the flat shaft 1312 is abutted against the waist-shaped groove 1223, so as to realize a positioning and fixation of the flat shaft 1312. The fixing nut 1232 is sleeved at both ends of the wheel axle 1311 and is threaded with the flat shaft 1312, so that a stability of a mounting of the wheel axle 1311 is further increased.

The fixed frame 122 in the disclosure may satisfy the mounting and fixation of large-size wheels, so that the power assembly with high-power may be mounted in the wheel hub of the large-size wheels, thereby satisfying a demand for power of an electric walk-behind cart.

The large-size wheels adopted will increase the chassis height of electric walk-behind cart. The walk-behind cart is provided with a universal wheel 32 mounted at the rear of the supporting bracket 121 and the driving wheel 31 mounted in the fixing frame 122, thereby adjusting a load-bearing center of gravity of the frame 1220 and avoiding a center of gravity of the chassis becoming higher due to a replacement of larger-size wheels, which effectively improves an overall stability of the electric walk-behind cart.

Please refer to FIG. 1 and FIG. 2. In this embodiment, both of the two driving wheels 31 are provided with the power assembly 2 and the braking assembly 4. The two driving wheels 31 are both provided with the power assembly 2, and controls the two power assemblies simultaneously through the control assembly 5 for simultaneously operating the two driving wheels 31, and improve a dynamic performance of driving wheels 31 and a stability in an operation of a vehicle body. Part of the braking assembly 4 are mounted on both the two driving wheels 31 for simultaneously braking the two driving wheels 31, brake quickly, and will not occur a phenomenon of side slipping, so that the walk-behind cart runs more safely.

Please refer to FIG. 3, FIG. 4 and FIG. 5. The power assembly 2 includes a hub motor 21. In this embodiment, a type of hub motor 21 adopts an external rotor type, for example a low-speed external rotor motor. Wherein, the hub motor 2 includes the wheel axle 1311 (a motor rotating shaft), a rotor core (not marked in the figure) and a permanent magnet (not marked in the figure). The two ends of the wheel axle 1311 are formed with the flat shaft 1312, and a flat part of the flat shaft 1312 is matched with a size of the opening 1224. The flat shaft 1312 passes vertically through the corresponding opening 1224, and the flat shaft 1312 is horizontally placed in the corresponding waist-shaped groove 1223, so that the two ends of the wheel axle 1311 are respectively clamped and fixed with the corresponding side plate 1221. And the wheel axle 1311 is rotatably connected with the wheel hub of and the driving wheel 31 through a bearing. The rotor core of the hub motor 21 is fixedly connected with a side wall of an inner cavity of the driving wheel 31 through a rotor bracket, and when a rotor of the hub motor 21 is running, a rotation of the driving wheel 31 is driven.

It should be noted that the two ends of the wheel axle 1311, the waist-shaped groove 1223 on the side plate 1221 and the positioning washer 1231 all adopt a waist-shaped structure, and the three are assembled with each other, so as to greatly improve a firmness of mounting the driving wheel 31 and the hub motor 21.

In summary, the disclosure arranges the driving wheel 31 in the fixing frame 22, so as to satisfy a mounting and fixation of the large-size wheel 3, and facilitate the power assembly with high-power to be mounted in the wheel hub of the large-size wheel 3, thereby satisfying the demand for power of the electric walk-behind cart. Through the assembly mode that both ends of the wheel axle 1311 are fixed with the side plate 221, the load may be effectively distributed on the side plate 221 on both sides of the wheel 311, which may bear the transportation of large load, and improve a mounting firmness and bearing performance of the driving wheel 31. The flat shafts 312 at both ends of the wheel axle 1311, the waist-shaped groove 223 on the side plate 221 and the through hole structure on the positioning washer 231 all adopt the waist-shaped structure, the three are assembled with each other, so that the mounting firmness between the driving wheel 31 and the fixing frame 22 is greatly improved. Therefore, the disclosure effectively overcomes various shortcomings in the conventional art and has a high degree of industrial utilization value.

Please refer to FIG. 7 and FIG. 8. In this embodiment, the braking assembly is mounted on the driving wheel 31, and each of the driving wheels 31 is provided with the braking assembly for braking the driving wheel 31. The control assembly 5 is arranged on the handle 13 and is located in a direction of the user. The control assembly 5 is electrically connected with power supply device 6, braking device 7 through a signal line, and a plurality of levers (not marked in the figure), a control knob (not marked in the figure) and a switch (not marked in the figure) are arranged on the control assembly 5, so that a control of the hub motor is realized, an on-off of the hub motor is controlled, a running power of the hub motor is adjusted, an adjustment of a driving speed of the electric walk-behind cart is realized, and an integration of electrical control in the electric walk-behind cart is improved, which is easy for users to operate.

Please refer to FIG. 7 and FIG. 8. The braking assembly 4 includes a first braking component 41 and a second braking component 42. The first braking component 41 is fixed in a cavity of the driving wheel 31 for the braking of the driving wheel 31. The second braking component 42 is fixed on the handle 13. Wherein, there are two first braking components 41 arranged on the walk-behind cart and correspond with the two driving wheels 31 one-to-one. The second braking component 42 includes two cables 423 and a signal line 425, and is connected with two first braking components 41 through the two cables 423. One second braking component 42 may control the first braking components 41 on the two driving wheels 31, and may enable the two driving wheels 31 to brake at the same time, which may improve a braking timeliness and safety, may also improve an integration of braking assembly 4, and reduce a number of parts of braking assemblies 4 and production cost. The second braking component 42 is further electrically connected with the control assembly 6 through the signal line 425, so that when the braking assembly 4 is in the braking state, a control connection between the control assembly 6 and the hub motor 21 is disconnected, and a braking performance and braking safety of the braking assembly 4 may be effectively improved.

Figure 9:
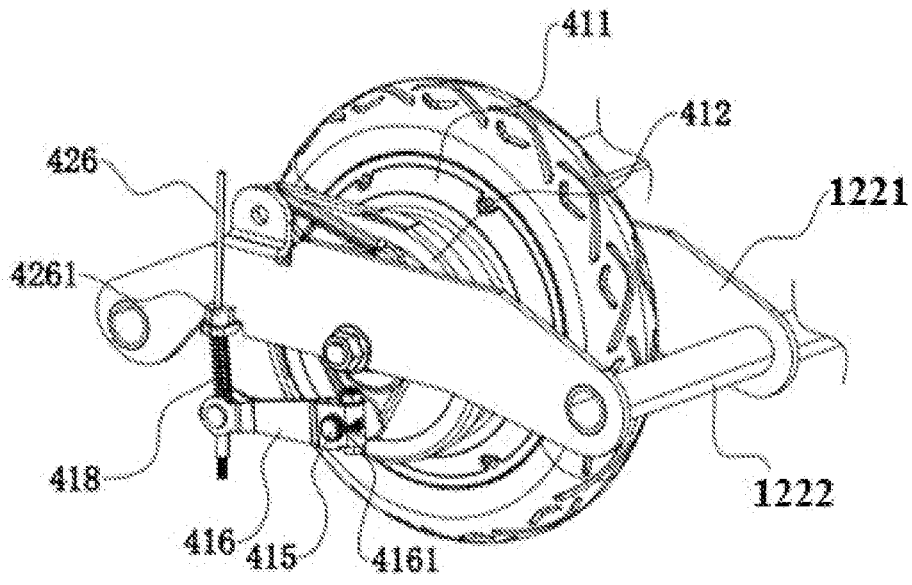
FIG. 9 is a schematic view of an outside of a first braking component according to at least one embodiment.
Figure 10:
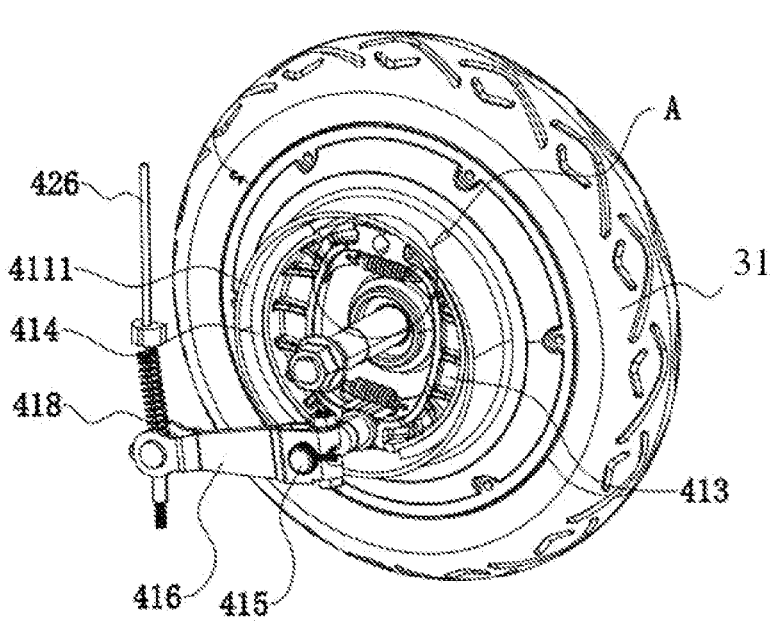
FIG. 10 is a schematic view of an inside of the first braking component according to at least one embodiment.
Figure 13:
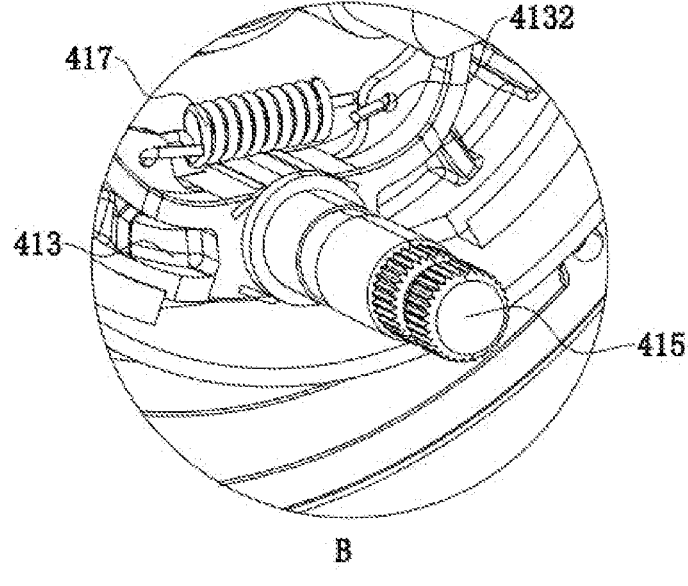
FIG. 13 is an enlarged view of part B in FIG. 12, which is mainly a schematic structural view of the adjustment rod.

Please refer to FIG. 5, FIG. 9 and FIG. 13. In this embodiment, the first braking component 41 includes a brake drum 411, a brake cover 412, a brake shoe 414, an adjustment rod 415 and an adjustment bracket 416. The brake drum 411 is coaxially fixed with the wheel hub of the driving wheel 31, and an accommodating cavity 4111 is formed inside the brake drum 411.

And one side of the accommodating cavity 4111 away from the hub motor 21 is an open end, and is used for mounting the brake shoe 413 and the braking pads 414. The brake cover 412 is fixed on the side plate 1211 by the bolts to close the open side of the accommodating cavity 4111. A through-hole structure (not marked in the figure) is coaxially arranged on the brake cover 412 for the wheel axle 1311 to pass through. It should be noted that the side plate 1211 fixedly connected with the brake cover 412 is the side plate 1211 on an outer side of the driving wheel 31. In addition, a supporting rod 4121 is further fixed on the brake cover 412, and the supporting rod 4121 extends toward the accommodating cavity 4111, which may support and position the brake shoe 413.

Please refer to FIG. 5, FIG. 9 and FIG. 13. The brake shoe 413 is arranged in the accommodating cavity 4111. In this embodiment, there are two brake shoes 413 in the accommodating cavity 4111, a shape and structure of the two brake shoes 413 are the same. In an embodiment, the two brake shoes 413 both are semicircular. An arc surface that is matched with an inner side wall of the accommodating cavity 4111 is formed on the brake shoe 413. The braking pads 414 are fixed on the arc surface, and correspond to the brake shoes 413 one-to-one. In addition, each first end of the two brake shoes 413 abutting against each other is provided with a semi-circular groove 4131, and the two semi-circular grooves 4131 are clamped with the supporting rod 4121 on the brake cover 412, so as to support the two brake shoes 4123. A second end of the two brake shoes 4123 abutting against each other clamps one end of the adjustment rod 415, and a rotation of the adjustment rod 415 may realize an expansion of the two brake shoes 413, so that the braking pad 414 abuts against the inner side wall of the accommodating cavity 4111, and an effect of braking is realized.

Please refer to FIG. 5, FIG. 9 and FIG. 13. Two ends of the brake shoe 413 are provided with connecting holes 4132, and an opening position, shape and size of the connecting holes 4132 on the two brake shoes 413 are the same. An elastic component is arranged between the two brake shoes 413, and the two brake shoes are connected with each other through the elastic component. In this embodiment, the elastic component includes a tension spring 417. Two ends of the tension spring 417 are respectively hooked with the connecting holes 4132 at a same end on the two brake shoes 413, and there are two tension springs 417 on the brake shoes 413, and correspond one to one with the two ends where the two brake shoes 413 are in contact.

Please refer to FIG. 5, FIG. 9 and FIG. 13. A first end of adjustment rod 415 is block-shaped, and clamped between the two brake shoes 413. When the driving wheel 31 is running normally, the first end of adjustment rod 415 that is block-shaped is vertically arranged, at this time, the two braking pads 414 are not in contact with the brake drum, and there is no braking force. When the driving wheel 31 is braking, the adjustment rod 415 rotates through the adjustment bracket 416, the block-shaped end is horizontally arranged, the two brake shoes 413 may be stretched out, the two braking pads 414 are in contact with the brake drum 411 at this moment, a braking force is generated, and the braking of the driving wheel 31 is realized. A second end of the adjustment rod 415 passes through the brake cover 412 to an outside of the accommodating cavity 4111, and is fixedly connected with a first end of the adjustment bracket 416, and the adjustment rod 415 is rotatably connected with the brake cover 412 through a bearing. Wherein, the second end of the adjustment rod 415 fixed with the adjustment bracket 416 is meshed and fixed with the adjustment bracket 416 through a clamping tooth structure. In an embodiment, the second end of the adjustment rod 415 extending to the outside of the accommodating cavity 4111 is provided with a clamping tooth (not indicated in the figure), and the clamping tooth is arranged along a circumferential direction of the adjustment rod 415. A penetrating hole 4161 is arranged on the adjustment bracket 416 at a connection of the adjustment bracket 416 and the adjustment rod 415. A clamping groove (not marked in the figure) is arranged in a hole wall of the penetrating hole 4161, and the clamping tooth is meshed with the clamping groove to realize a fixing connection. In addition, the adjustment bracket 416 further adopts a structural principle of a hoop. In an embodiment, one side of the penetrating hole 4161 is opened along a direction perpendicular to an axis of the penetrating hole 4161, and the hole wall of the penetrating hole 4161 and the adjustment rod 415 are held tightly with each other through a bolt, so that the adjustment rod 415 and the adjustment bracket 416 are detachably connected with each other.

Please refer to FIG. 5, FIG. 9 and FIG. 13. A second end of the adjustment bracket 416 is in a transmission connection with the first braking component 41 through the cable 423, and a line tube 426 is sleeved on the cable 423. The line tube 426 may play a protective role in the cable 423, a block 4261 is fixed at one end of the cable 423 close to the adjustment bracket 416, and the block 4261 is fixed on the side plate 1211. A first return spring 418 is further sleeved on the cable 423, and the two ends of the first return spring 418 respectively abut against the block 4261 and the adjustment bracket 416 tightly. A user drives the adjustment bracket 416 to rotate through the cable 423 in the first braking component 41, so that the first return spring 418 between the block 4261 and the adjustment bracket 416 is in a compression state. After the braking is finished, the first return spring 418 resets the adjustment bracket 416.

Figure 14:
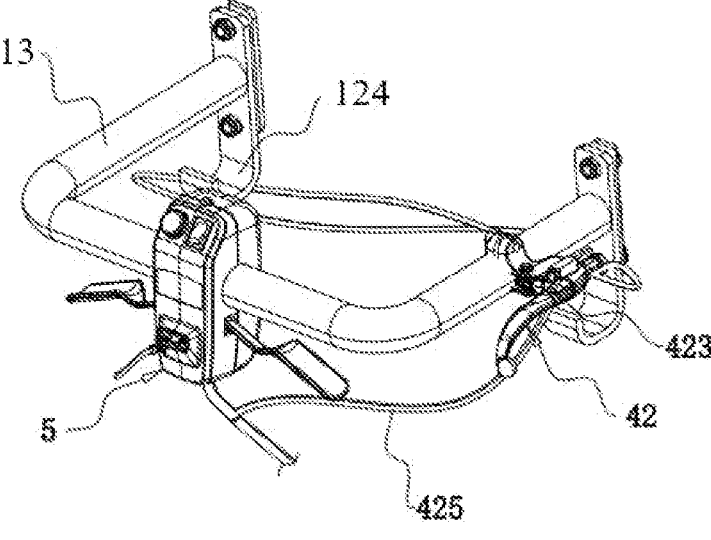
FIG. 14 is an assembly view of a second braking component mounted on the handle according to at least one embodiment.
Figure 15:
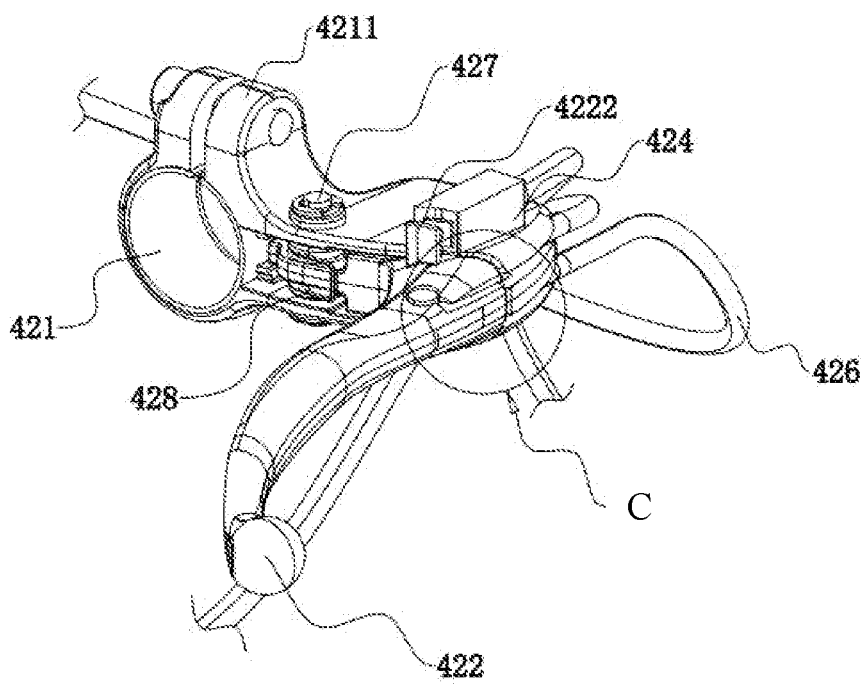
FIG. 15 is a schematic structural view of the second braking component according to at least one embodiment.
Figure 16:
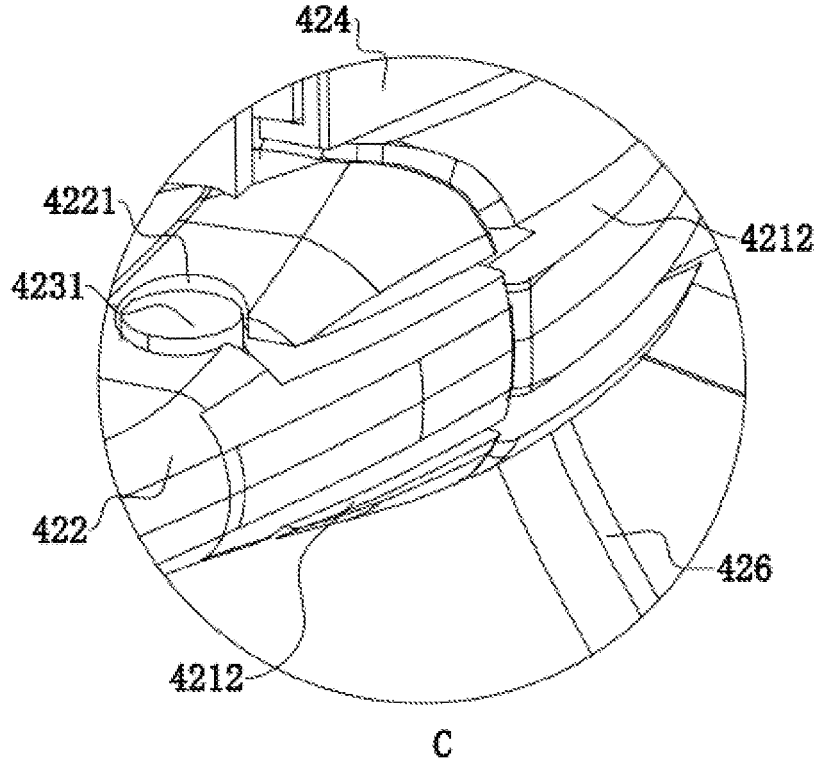
FIG. 16 is an enlarged view of part C in FIG. 15 which is mainly a schematic structural view of a clamping groove and an inserting groove.
Figure 17:
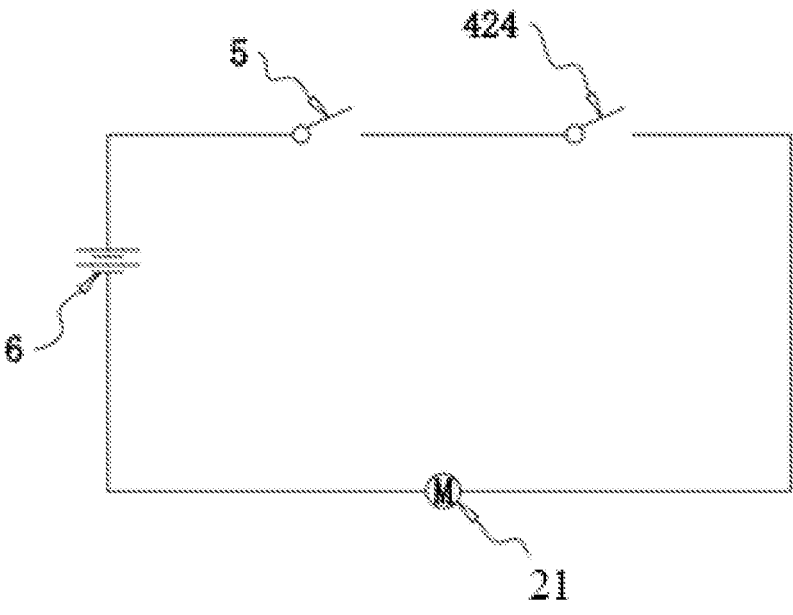
FIG. 17 is a circuit view showing the connection between a control device, a braking switch, a hub motor, and a power supply device.
Figure 18:
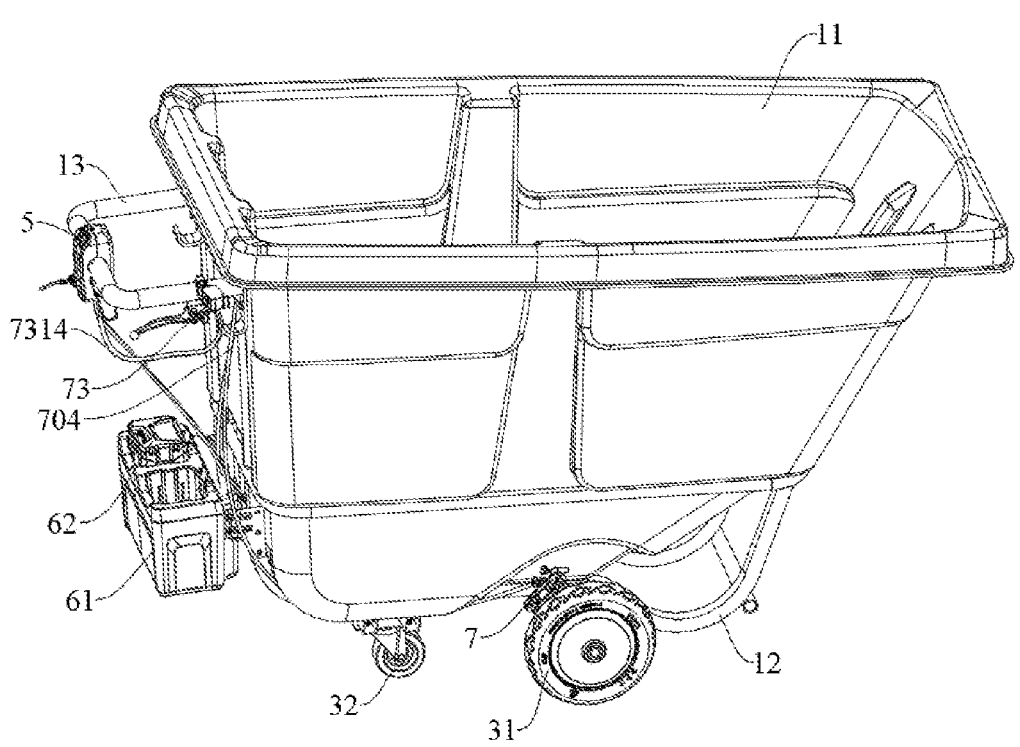
FIG. 18 is a schematic structural view of a walk-behind cart of the disclosure.

Please refer to FIG. 14 through FIG. 16. In this embodiment, the second braking component 42 further includes a mounting sleeve 421, a braking handle 422, a braking switch 424 and the signal line 425. The mounting sleeve 421 is fixed on the handle 13 by adopting a principle of a hoop structure, which means that an opening is arranged on the mounting sleeve 421. The two sides of the opening are integrally provided with ear plates 4211, and the two ear plates 4211 are fixedly connected through the bolts, so that the mounting sleeve 421 is held tightly on the handle 13. The mounting sleeve 421 is vertically penetrated and provided with a first rotating shaft 427, the braking handle 422 is rotatably connected with the mounting sleeve 421 through the first rotating shaft 427, and a connection of the braking handle 422 and the first rotating shaft 427 is provided with a second return spring 428. After the user releases the braking handle 422, the second return spring 428 returns the braking handle 422 to its original position through an elastic potential energy generated by its own compression, so as to facilitate a next braking operation.

Please refer to FIG. 14 through FIG. 16. Two clamping grooves 4221 are arranged on the braking handle 422, and the two clamping grooves 4221 are arranged at one end of the braking handle 422 close to the mounting sleeve 421 and are located on two sides of the braking handle 422. The two clamping grooves 4221 correspond one-to-one with the two cables 423, one end of the cable 423 connected with the braking handle 422 is provided with a clamping block 4231, and the clamping cable 423 is clamped and connected with the braking handle 422 through a clamping matching of the clamping block 4231 and the clamping groove 4221. Both abutting positions of the mounting sleeve 421 and the braking handle 422 are provided with an inserting groove 4212 that is communicated with the clamping groove 4221, and the inserting grooves 4212 corresponds to the two clamping grooves 4221. The cable 423 and the line tube 426 are arranged in the inserting groove 4212. Wherein, the inserting groove 4212 on the mounting sleeve 421 clamps one end of the line tube 426 in the inserting groove 4212, and the two ends of the line tube 426 may be fixed through the inserting groove 4212 and the block 4261.

Figure 11:
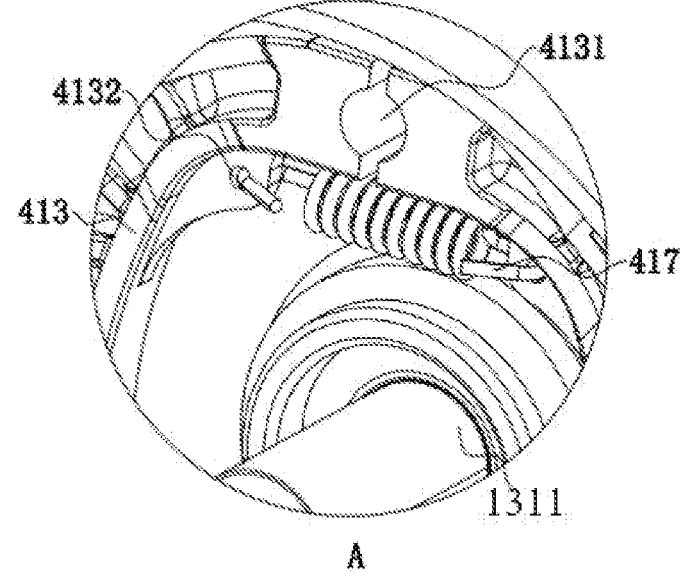
FIG. 11 is an enlarged view of part A in FIG. 10, which is mainly a schematic connection view of two brake shoes.
Figure 12:
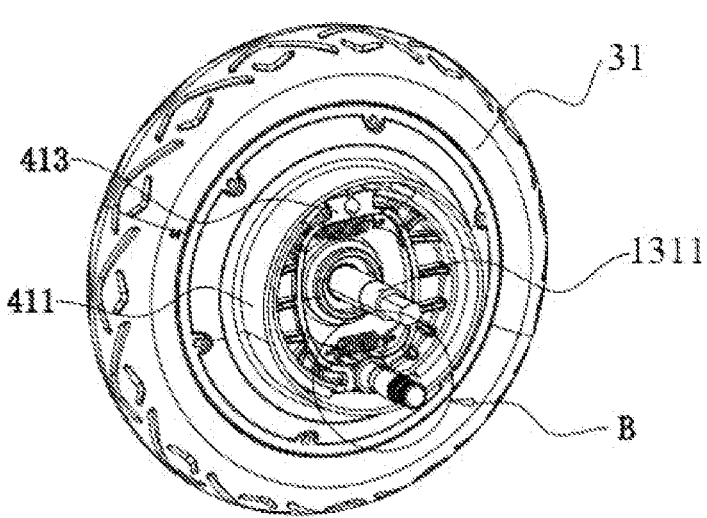
FIG. 12 is a schematic assembly view of an adjustment rod according to at least one embodiment.

Please refer to FIG. 14 through FIG. 16. The braking switch 424 is fixed on the mounting sleeve 421, and a contact point of the braking switch 424 is in a transmission connection with the braking handle 422, and is electrically connected with the control assembly 6 through the signal line 425. Wherein, a touch plate 4222 is vertically fixed on the braking handle 422, and the contact point of the braking switch 424 corresponds to the touch plate 4222. FIG. 11 is a circuit diagram among the control assembly 5, the braking switch 424, the hub motor 21 and the power supply device 6. When user toggles the braking handle 422, the touch plate 4222 is separated from the contact point of the braking switch 424, and braking switch 424 is in a disconnected state, so that control assembly 5 receives state information of a braking of the walk-behind cart through the signal line 425, and a control connection between the control assembly 5 and the hub motor 21 is disconnected. At this moment, the hub motor 21 stops running, which avoids a situation that the braking assembly 4 and the hub motor 21 run at the same time, thereby improving a braking performance and braking safety of the braking assembly 4. When the braking assembly 4 does not need to brake, the touch plate 4222 on the braking handle 422 abuts against the contact point of the braking switch 424, and the braking switch 424 is in a closed state, so that a circuit connection in the walk-behind cart may work normally, and the control connection between the control assembly 5 and the hub motor 21 is restored.

Please refer to FIG. 14 through FIG. 16. The control assembly 5 is arranged on the handle 13 and is located in a direction of the user. The control assembly 5 is electrically connected with the power supply device 6 and the braking switch 424 through the signal line 425, and a plurality of levers (not marked in the figure), a control knob (not marked in the figure) and a switch (not marked in the figure) are arranged on the control assembly 5, so that a control of the hub motor 21 is realized, an on-off of the hub motor 21 is controlled, a running power of the hub motor 21 is adjusted, an adjustment of a driving speed of the walk-behind cart is realized, and an integration of electrical control in the walk-behind cart is improved, which is easy for users to operate.

Please refer to FIG. 8, FIG. 14 through FIG. 17. In this embodiment, the power supply device 6 includes a battery box 61, a battery pack cavity 62, a battery pack 63 and a power cable (not marked in the figure). The battery box 61 is fixedly connected with the handle 13, and the battery pack cavity 62 is arranged in the battery box 61. It should be noted that there are two battery pack cavities 62 arranged in the battery box 61. The battery pack 63 is detachably mounted in the battery pack cavity 62, and electrically connects with the hub motor 21 through the power cable, so as to supply power for the hub motor 21 and the control assembly 5. In addition, the battery box 61 is located at a rear part of the wagon box 11 and is located below the handle 13. Through adopting a structural form in which a counterweight of a vehicle body weight is set to 50% at a front part and 50% at a rear part, a center of gravity of the walk-behind cart is located at a middle and bottom position of a whole, and when the walk-behind cart is pushed or lifted, a center of gravity of a vehicle body is stable, which is not easy to tip over, and is safe to use and easy to operate.

When the walk-behind cart needs to brake, the user toggles the braking handle 422, and the braking switch 424 is disconnected, so that the power supply device 6 stops supplying power to the hub motor 21, and the hub motor 21 stops running. Simultaneously, the braking handle 422 may pull the cable 423, so that the adjustment bracket 416 rotates along an axial direction of the adjustment rod 415, thereby driving the adjustment rod 415 to rotate. The adjustment rod 415 is clamped at one end between the two brake shoes 413 and the two brake shoes 413 are stretched out, so that the braking pads 414 fixed on the brake shoes 413 abut against an inner side wall of the brake drum 411. Since positions of the braking pads 413 are substantially unchanged with respect to the walk-behind cart, the brake drum 411 is in a rotating state, and a friction force generated between the braking pad 413 and the brake drum 411 may reduce a speed of the driving wheel 31, and then realize the braking of the walk-behind cart. After the braking of the walk-behind cart ends, the user loosens the braking handle 422, the braking switch 424 is closed again, and an electrical connection among the control assembly 5, the power supply device 6 and the hub motor 21 is restored. The first return spring 418 and the second return spring 428 respectively reset the braking handle 422 and the adjustment bracket 416 to an original position, so that the braking pad 414 in the brake drum 411 is separated from the inner side wall of the brake drum 411, and then the driving wheel 31 may operate normally.

In summary, in some embodiments of this disclosure, the second braking component 42 is electrically connected with the control assembly 5 through the signal line 425, so that when the braking assembly 4 is in the braking state, the control connection between the control assembly 5 and the hub motor 21 is disconnected, which may effectively improve the braking performance and braking safety of the braking assembly 4. The first braking components 41 on the two driving wheels 31 may be controlled through one second braking component 42, so that the two driving wheels 31 may be braked simultaneously, the braking timeliness and safety may be improved, an integration of the braking assembly 4 may also be improved, a number of parts of the braking assembly 4 is reduced, and a production cost may be reduced. The hub motors 21 are mounted on the two driving wheels 31, and the two hub motors 21 are controlled simultaneously by the control assembly 5, so that a simultaneous operation of the two driving wheels 31 may be realized, which improves a dynamic performance of the driving wheel 31 and a stability in a vehicle body operation. The first braking components 41 are mounted on both of the two driving wheels 31, which may realize a simultaneous braking of the two driving wheels 31, brake quickly, and a side slip does not occur, and enable the walk-behind cart to run safer. Therefore, the disclosure effectively overcomes various shortcomings in the conventional art and has a high degree of industrial utilization value.

Please refer to FIG. 18 through FIG. 29. In another embodiment, the driving wheel 31 is connected with the frame 12 through a bearing base 701. The bearing base 701 is fixedly mounted at the bottom of the frame 12, and a brake disc 301 is fixedly arranged on one side of the driving wheel 31. The driving wheel 31 is fixedly connected with the bearing base 701 through a second rotating shaft 702. In one embodiment, the driving wheel 31 and the brake disc 301 are both arranged on the second rotating shaft 702, and the driving wheel 31 and the brake disc 301 can rotate synchronously around the second rotating shaft 702.

Please refer to FIG. 19, FIG. 21 through FIG. 27. a flat groove 7021 is arranged on one end of the second rotating shaft 702 connected with the bearing base 701, the end of the second rotating shaft 702 provided with the flat groove 7021 extends into the bearing base 701, and the second rotating shaft 702 is fixedly connected with the bearing base 701 through a pressing plate 7012. The pressing plate 7012 is located at the flat groove 2011. This structural fixing mode is simple and effective, a rotation of the second rotating shaft 702 and a movement of along left and right directions of the second rotating shaft 702 are limited simultaneously, and the hub motor 21 is prevented from shaking and falling off in the bearing base 701.

Please refer to FIG. 19, FIG. 21 through FIG. 27. In this embodiment, the braking assembly 7 is mounted on the bearing base 701. In one embodiment, the braking assembly 7 includes a first driving component 71 and a braking pad 72. The first driving component 71 is fixedly connected with the bearing base 701, and the braking pad 72 is mounted on the first driving component 71. In this embodiment, for example, the first driving component 71 is set as a pump body. The first driving component 71 includes a housing 711 and a piston 712. The piston 712 is arranged in the housing 711 and forms an oil storage cavity 703 between the housing 711. An oil inlet 7111 is arranged on the housing 711. The oil inlet 7111 is communicated with the oil storage cavity 703, and the oil inlet 7111 is connected with a hydraulic oil tube 704. Hydraulic oil enters the oil storage cavity 703 of the housing 711 along the oil inlet 7111 to push the piston 712 to move in a direction of the brake disc 301.

Please refer to FIG. 19, FIG. 21 through FIG. 27. In this embodiment, the braking pad 72 comprises a first braking pad 721 and a second braking pad 722, the first braking pad 721 is fixedly connected with the piston 712, the second braking pad 722 is fixedly connected with the housing 711 of the first driving component 71, and the brake disc 301 is located between the first braking pad 721 and the second braking pad 722. In one embodiment, there is a gap between the first braking pad 721 and the second braking pad 722, an edge of the brake disc 301 is partially located in the gap. When the hydraulic oil enters the oil storage cavity 703 of the housing 711 along the oil inlet 7111, so that the piston 712 is pushed, thereby further pushing the first braking pad

721, causing the first braking pad 721 to gradually approach the second braking pad 722, thereby contacting and squeezing the brake disc 301 and generating frictional force. Since the brake disc 301 and the driving wheel 31 are fixed together, a purpose of braking is achieved.

Figure 19:
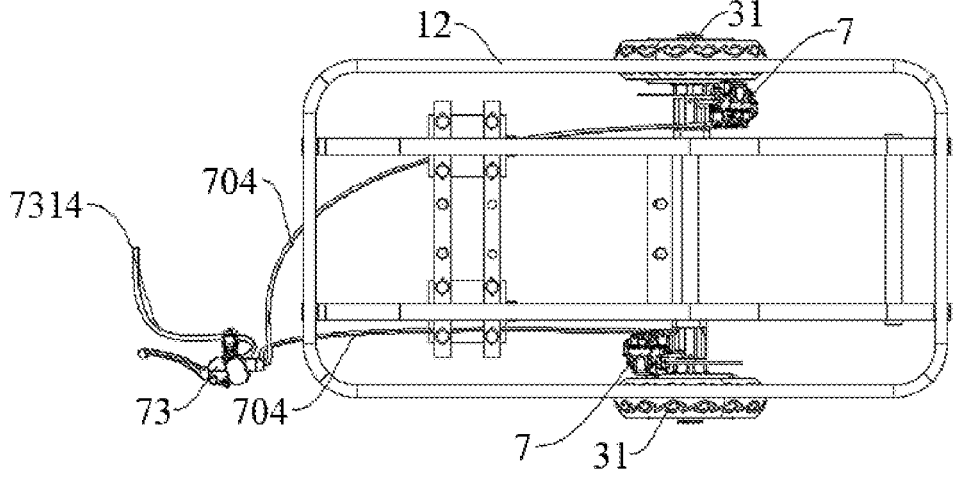
FIG. 19 is a first schematic structural view of the walk-behind cart according to at least one embodiment.
Figure 20:
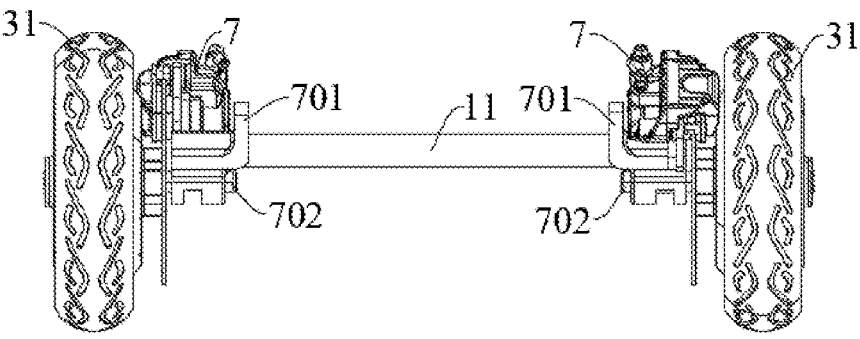
FIG. 20 is a schematic assembly view of a braking assembly and the driving wheel according to at least one embodiment.
Figure 21:
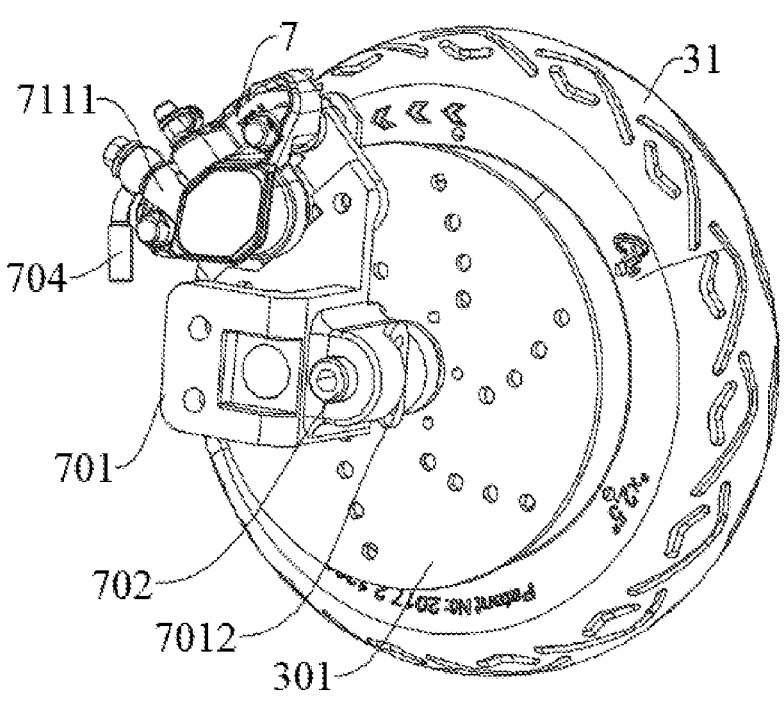
FIG. 21 is a schematic axial side view of the braking assembly and the driving wheel according to at least one embodiment.
Figure 22:
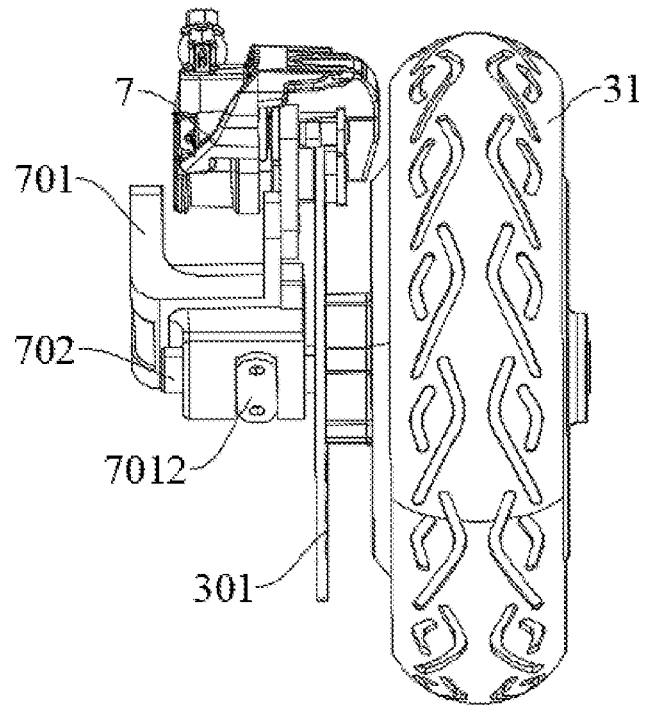
FIG. 22 is a front view of the braking assembly and the driving wheel according to at least one embodiment.
Figure 23:
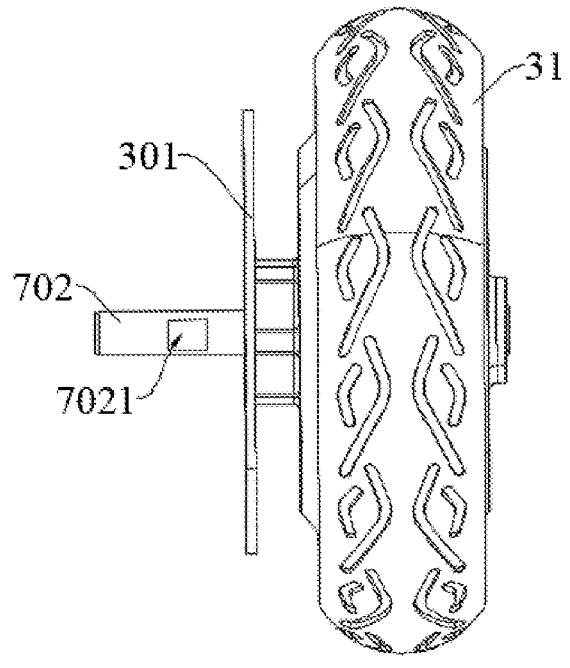
FIG. 23 is a schematic structural view of the driving wheel according to at least one embodiment.
Figure 24:
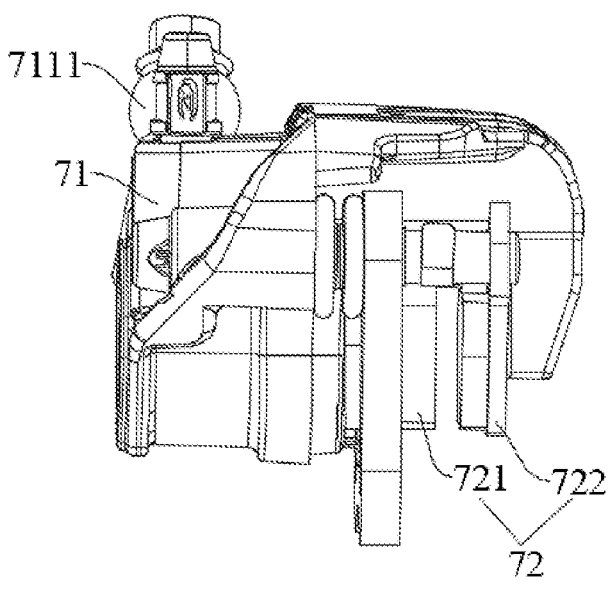
FIG. 24 is a schematic structural view of the braking assembly according to at least one embodiment.
Figure 25:
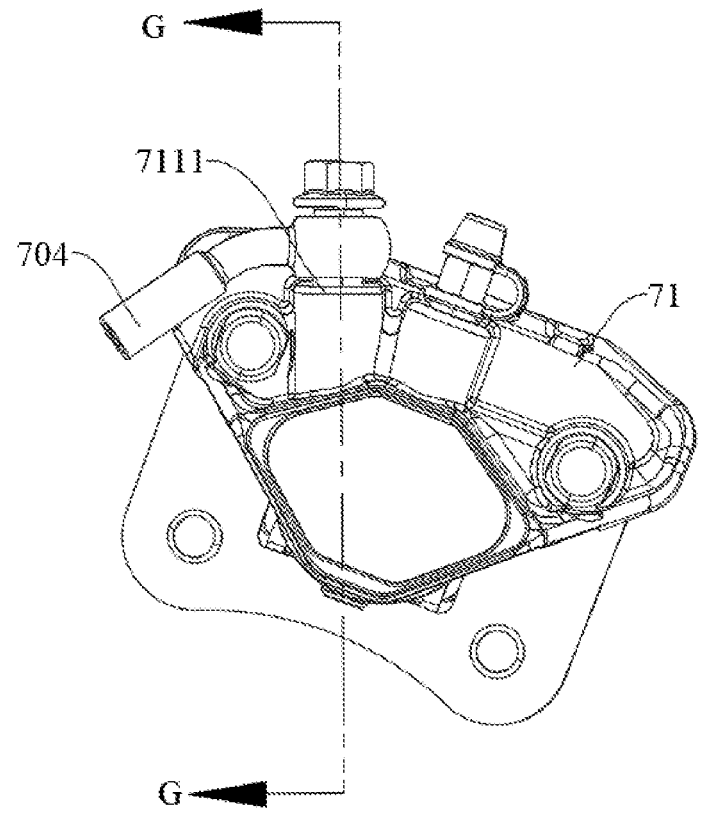
FIG. 25 is a schematic structural view of the braking assembly from another angle according to at least one embodiment.
Figure 26:
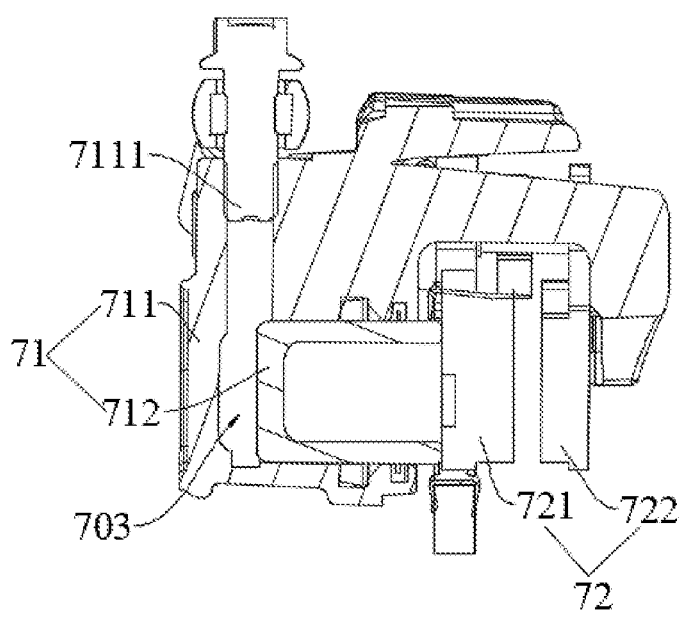
FIG. 26 is a schematic structural view of a cross-section along G-G in FIG. 25.
Figure 27:
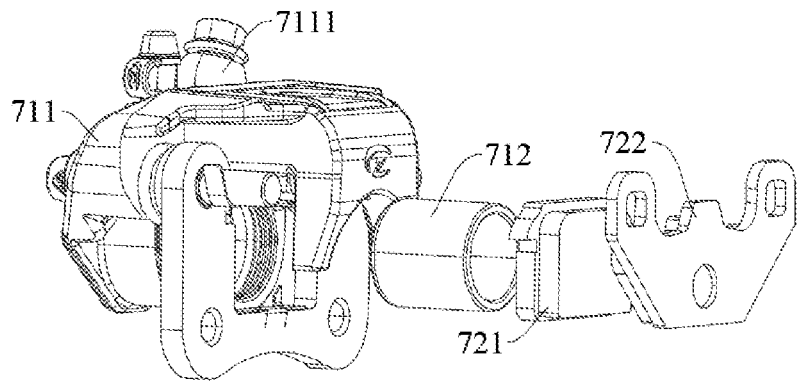
FIG. 27 is a schematic exploded view of the braking assembly according to at least one embodiment.
Figure 28:
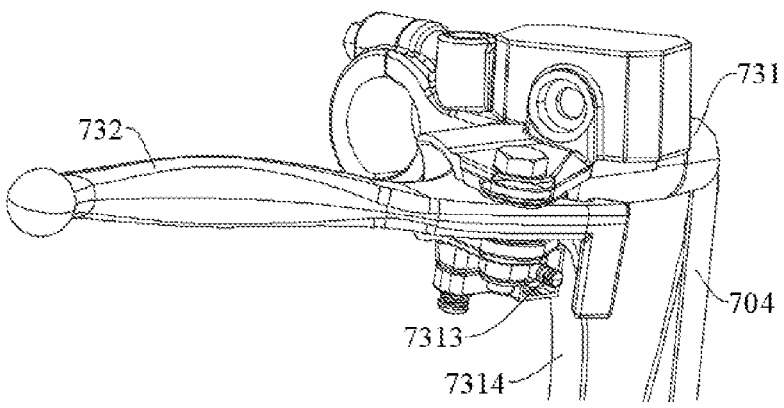
FIG. 28 is a schematic structural view of an operation assembly according to at least one embodiment.
Figure 29:
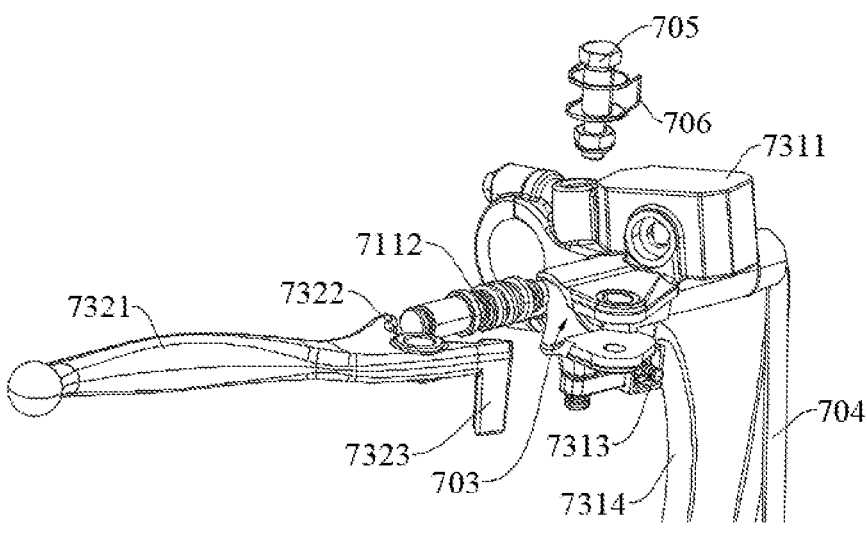
FIG. 29 is a schematic exploded view of the operation assembly according to at least one embodiment.

Please refer to FIG. 19, FIG. 28 and FIG. 29. In this embodiment, the frame 12 is further provided with an operation assembly 73, and the operation assembly 73 includes a second driving component 731 and a braking handle 732. In one embodiment, the second driving component 731 is mounted on the frame 12, the second driving component 731 is connected with the first driving component 71 through the hydraulic oil tube 704. In this embodiment, the second driving component 731 is for example set as a pump body. In one embodiment, the second driving component 731 includes an oil casing 7311. An oil tube screw 7112 is arranged in the oil casing 7311, and the oil storage cavity 703 is formed between the oil tube screw 7112 and the oil casing 7311. The oil storage cavity 703 of the second driving component 731 is communicated with the oil storage cavity 703 of the first driving component 71 through the hydraulic oil tube 704, and the braking handle 732 is mounted on the oil casing 7311 of the second driving component 731 and is used for pushing the oil tube screw 7112.

Please refer to FIG. 19, FIG. 28 and FIG. 29. In this embodiment, when braking is required, the braking handle 732 is wrenched so that the braking handle 732 pushes the oil tube screw 7112 in the second driving component 731 to move. The hydraulic oil in the oil storage cavity 703 of the second driving component 7312 is extruded along the hydraulic oil tube 704 into the oil storage cavity 703 of the first driving component 71, and the piston 712 is pushed under a pressure of the hydraulic oil, thereby pushing the braking pad 32, so that the braking pad 32 contacts and squeezes the brake disc 301.

Please refer to FIG. 19, FIG. 28 and FIG. 29. In this embodiment, the braking handle 732 is rotatably connected with the oil casing 7311 through a rotation shaft 705, a third return spring 706 is sleeved on the rotation shaft 705. When the braking handle 732 is wrenched, the third return spring 706 is compressed. When the braking handle 732 is loosened, the braking handle 732 is driven to return to its original position under an elastic force of the third return spring 706.

Please refer to FIG. 19, FIG. 28 and FIG. 29. In this embodiment, the frame 12 includes the handle 13. The operation assembly 73 is mounted on the handle 13, and the control assembly 5 (a control box) is further mounted on the handle 13. The control assembly 5 is used for controlling the walk-behind cart. In this embodiment, a switch 7313 is arranged at a bottom of the second driving component 731, and the switch 7313 is connected with the control assembly 5 on the frame 12 through a signal line 7314.

Please refer to FIG. 19, FIG. 28 and FIG. 29. In this embodiment, when the switch 7313 is in a disconnected state, the signal line 7314 may not transmit signals to the control assembly 5, and the control assembly 5 may not control a turning on and off functions of the hub motor 21, which means that the on-off of the walk-behind cart may not be controlled. When the switch 7313 is in a connected state, the signal line 7314 can transmit signals to the control assembly 5, and the control assembly 5 restores to control the turning on and off functions of the hub motor 21. The switch 7313 forms a linkage with the braking process of the walk-behind cart by setting the switch, and when braking, a control effect of the control assembly 5 on the walk-behind cart is temporarily disconnected, so as to avoid an occurrence of accidental touch, thereby causing danger.

Please refer to FIG. 19, FIG. 28 and FIG. 29. In one embodiment, the frame 12 is further provided with the wagon box 11, one side of the wagon box 11 is provided with the power supply device 6 to provide power source for the walk-behind cart. When the switch of control assembly 5 is pressed and held, the hub motor 21 starts, and the walk-behind cart runs. When the switch of control assembly 5 is loosened, then hub motor 21 closes, and the walk-behind cart stops running.

Please refer to FIG. 19, FIG. 28 and FIG. 29. In this embodiment, the braking handle 732 includes a holding part 7321, a braking part 7322 and a switch triggering part 7323. The holding part 7321 is used for an operator to hold, the braking part 7322 and the switch triggering part 7323 are located at a same end of the holding part 7321, and there is an angle between the braking part 7322 and the switch triggering part 7323. The braking part 7322 is used for pushing the oil tube screw 7112 in the second driving component 731 to move, and the switch triggering part 7323 is used for controlling an on-off of the switch 7313.

Please refer to FIG. 18 through FIG. 29. In one embodiment, a braking process of the walk-behind cart is as follows: the operator wrenches the braking handle 42 through the holding part 7321, causes the braking part 7322 to contact with the oil tube screw 7112 in the second driving component 731, and pushes the oil tube screw 7112 to move forward to compress the oil storage cavity 703 in the second driving component 731, so that the hydraulic oil in the oil storage cavity 703 of the second driving component 731 enters the oil storage cavity 703 of the first driving component 71 along the hydraulic oil tube 704. Under a pressure of the hydraulic oil, the piston 712 is pushed to further push the first braking pad 721, so that the first braking pad 721 gradually approaches the second braking pad 722, thereby contacting and squeezing the brake disc 301 to achieve a purpose of braking the hub motor 21. And it should further be explained that while the braking handle 42 is wrenched to push the oil tube screw 7112, the switch triggering part 7323 of the braking handle 42 is detached from the switch 7313. The switch 7313 is disconnected, so that it may not transmit a signal to the control assembly 5 through the signal line 414, so as to avoid the hub motor from being in a driving state when braking, and the hub motor is powered off and loses rotating power at this moment.

Please refer to FIG. 18 through FIG. 29. In this embodiment, when the walk-behind cart needs to be started, the braking handle 42 is loosened, the braking handle 73 is restored to its original position under the elastic force of the return spring 403. At this moment, the oil tube screw 7112 loses a driving effect of the braking handle 42, so that the oil tube screw 7112 moves back under a pressure of the hydraulic oil. The hydraulic oil in the hydraulic oil tube 704 flows back into the second driving component 731, and then the piston 712 moves back to drive the braking pad 721, causing the braking pad 721 to gradually move away from the brake disc 301 to relieve a braking effect on the hub motor 21. And it should further be explained that when the braking handle 732 is wrenched to return to a starting position, the switch triggering part 7323 of the braking handle 732 triggers the switch 7313, so that the switch 7313 is in a connected state. At this time, it can transmit signals to the control assembly 5 through the signal line 414, so that the control assembly 5 recovers the turning on and off functions of the hub motor 21.

Please refer to FIG. 18 through FIG. 29. It should further be noted that, in this embodiment, two sides of a bottom of the frame 12 are symmetrically provided with the bearing base 701 respectively. Each of the bearing bases 701 on two sides is respectively provided with the driving wheel 31 and the braking assembly 30, and the second driving component 731 in the operation assembly 73 is connected with the first driving component 71 in the braking assembly 7 on both sides respectively through two hydraulic oil tubes 704, so as to achieve that one second driving component 731 may control braking functions of the two hub motors 21, which enables it to be more convenient to operate, and the two wheels are braked at the same time, may be braked quickly without side slipping and enable an operation of the walk-behind cart to be safer. In this disclosure, a braking structure of the walk-behind cart is mechanically driven, which can ensure safety and avoid a braking failure of an electric braking device due to insufficient power.

In summary, the braking assemblies are respectively arranged on both sides of the bottom of the frame to avoid that when the walk-behind cart is loaded with heavy objects and walks on a road surface with slopes, a user is exhausted or accidentally falls, or when the battery pack is insufficient, etc., the walk-behind cart may slip backwards and out of control, which may avoid injury to property and personal safety. And the two braking assemblies are simultaneously controlled through one operation assembly, so that their operation is more convenient, and two wheels may be braked at the same time, which may realize a rapid braking, and avoid the phenomenon of side slip when braking, and a running process of the walk-behind cart is safer. In addition, a linkage with the braking process of the walk-behind cart is formed by setting the switch, and when braking, a control effect of the control box on an on-off of the walk-behind cart is temporarily disconnected, so as to avoid an occurrence of accidental touch, thereby causing danger.

Please refer to FIG. 30 through FIG. 38. In this embodiment, the control assembly includes a steering control device, the steering control device is electrically connected with the power assembly in the driving wheel on both sides of the vehicle body assembly and is used for controlling a steering of the driving wheel on both sides of the vehicle body assembly, the steering control device includes a bracket and a steering switch, a control panel is mounted in the bracket, the steering switch is mounted on the bracket and is connected with the control panel, and the steering switch controls the steering of the driving wheels on both sides of the vehicle body assembly. This means that a first hub motor 311 and a second hub motor 312 in the driving wheels 31 on two sides of the vehicle body assembly are connected with the steering control device to control a steering of the first hub motor 211 and the second hub motor 212. It should be further noted that the frame 12 is further provided with the power supply device for providing power source for the walk-behind cart.

Please refer to FIG. 1 through FIG. 36. In this embodiment, when the first hub motor 211 and the second hub motor 212 rotate in a same direction, the walk-behind cart is in a forward or backward state. When the first hub motor 211 and the second hub motor 212 rotate in different directions, the walk-behind cart is in a left or right turn state. And it should be noted that a rotation speed of the first hub motor 211 and the second hub motor 212 is the same, therefore, when the first hub motor 211 and the second hub motor 212 rotate in different directions to turn left or right, a zero turning process can be realized.

Please refer to FIG. 30, FIG. 32 through FIG. 35. In this embodiment, the steering control device 83 is arranged on the handle 13 and is used for controlling the first hub motor 211 and the second hub motor 212. In one embodiment, the steering control device 83 includes a bracket 831, a steering handle 832, a main switch 833, a control panel 834 and a steering switch 835. The bracket 831 is fixedly mounted on the handle 13, the control panel 834 is mounted inside the bracket 831, the main switch 833 is also installed inside the bracket 831, and the main switch 833 is electrically connected with the control panel 834. The steering handle 832 is arranged on the bracket 831, the steering handle 832 is used to control the main switch 833, and the steering switch 835 is arranged on the bracket 831 and is electrically connected with the control panel 834. The steering switch 835 is used to control a steering of the first hub motor 211 and the second hub motor 212, thereby controlling the steering of the walk-behind cart.

Please refer to FIG. 30, FIG. 32 through FIG. 35. In this embodiment, the steering handle 832 is rotatably connected with the bracket 831 through a third rotating shaft 8321, which means that the third rotating shaft 8321 is rotatably mounted on the bracket 831. The steering handle 832 is mounted on the third rotating shaft 8321, and the third rotating shaft 8321 is further sleeved with a fourth return spring 8322. In an initial state, the steering handle 832 is in a state of pressing the main switch 833, the steering handle 832 is wrenched, and the steering handle 832 is far away from the main switch 833, so that the main switch 833 is released. When the steering handle 832 is loosened, under an effect of the fourth return spring 8322, the steering handle 832 returns to its original position, and the main switch 833 is re-pressed.

Please refer to FIG. 30, FIG. 32 through FIG. 35. In this embodiment, the control panel 834 is provided with three different gear lines: a left turn gear "L", a middle gear "0" and a right turn gear "R", which are controlled and switched through the steering switch 835. It should be noted that the bracket 831 is provided with a pressing plate 836, the pressing plate 836 is fixedly connected with the bracket 831, and the steering switch 835 is fixedly mounted on the bracket 831. It should be noted that the pressing plate 836 is fixedly connected with the bracket 831 by welding or buckling. In this embodiment, the control panel 834 is further provided with at least one indication light, and the indication light is mounted on the pressing plate 836 and configured to indicate a current gear state of the walk-behind cart.

Please refer to FIG. 30, FIG. 32 through FIG. 35. In this embodiment, a number of the indication lights is set to three for example, they are respectively the first indication light 8371, the second indication light 8372 and the third indication light 8373. The first indication light 8371, the second indication light 8372 and the third indication light 8373 correspond to the three different gears: the left turn gear "L", the middle gear "0" and the right turn gear "R" respectively, which means that when the walk-behind cart is a certain gear in the left-turn gear "L", the middle gear "0" and the right turn gear "R", the indication light corresponding to the gear is on, and other indication lights are off. For example, when the walk-behind cart is in the left turn state, the first indication light 8371 lights up, and the middle gear "0" and the right turn gear "R" are in an off state. Of course, in other embodiments, the number of the indication lights may also be set to one indication light that may present different colors. For example, it may be set to three different colors: red, green and yellow. Each color corresponds to one of three different gears: the left turn gear "L", the middle gear "0" and the right turn gear "R" respectively. When the walk-behind cart is a certain gear in the left turn gear "L", the middle gear "0" and the right turn gear "R", this indication light presents color corresponding with this gear to remind the user.

Please refer to FIG. 30, FIG. 32 through FIG. 35. It should be noted that the control assembly 5 (control box) is further mounted on the bracket 831. The control assembly 5 is electrically connected with the steering control device 83 through a first signal line 8381. When the steering switch 835 is controlled, after one of the three different gear lines in the left turn gear "L", the middle gear "0" and the right turn gear "R" set in the control panel 834 is connected, the control switch on the control assembly 5 is further required to be pressed to be connected to an entire driving line, so that the first hub motor 211 and the second hub motor 212 rotate in the same or opposite direction, and the walk-behind cart may move forward normally or steer.

Figure 30:
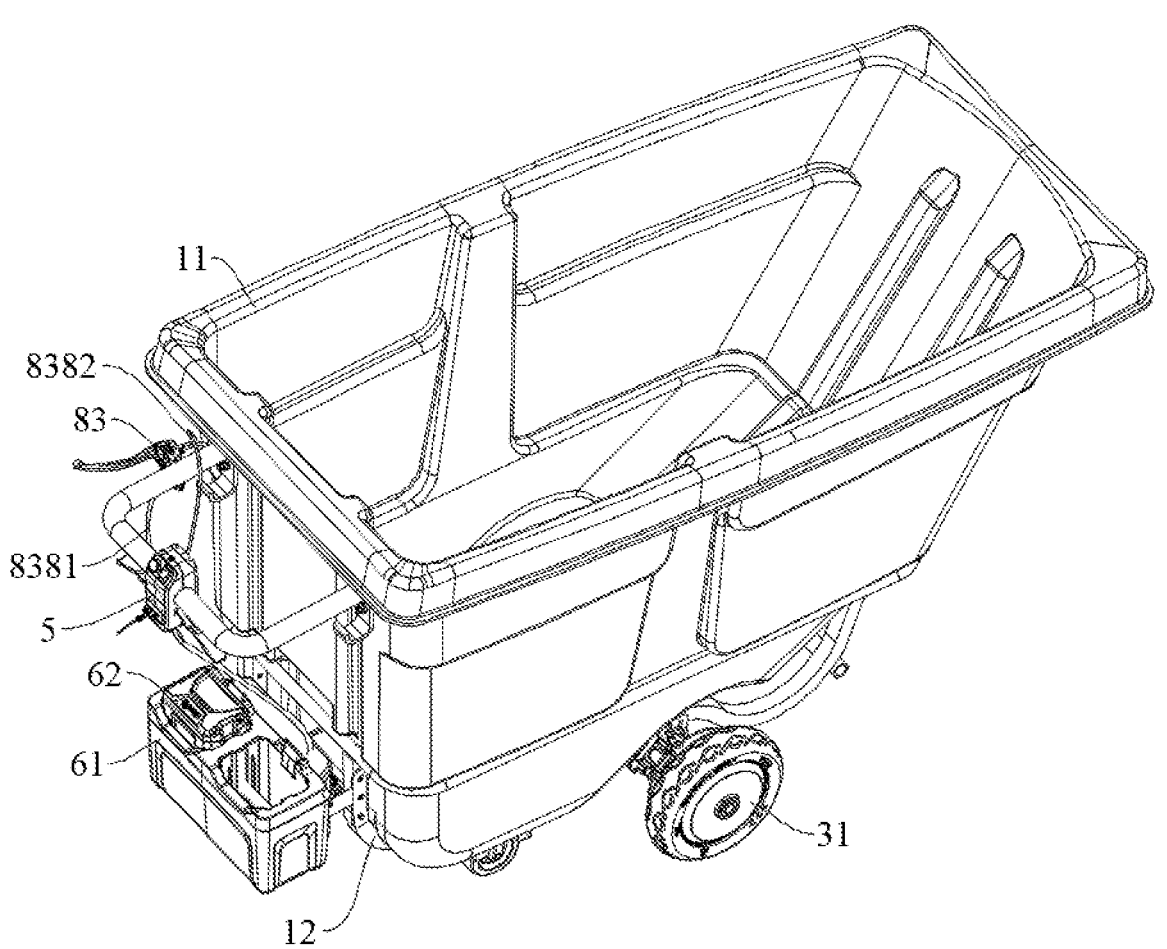
FIG. 30 is a second schematic structural view of the walk-behind cart according to at least one embodiment.
Figure 31:
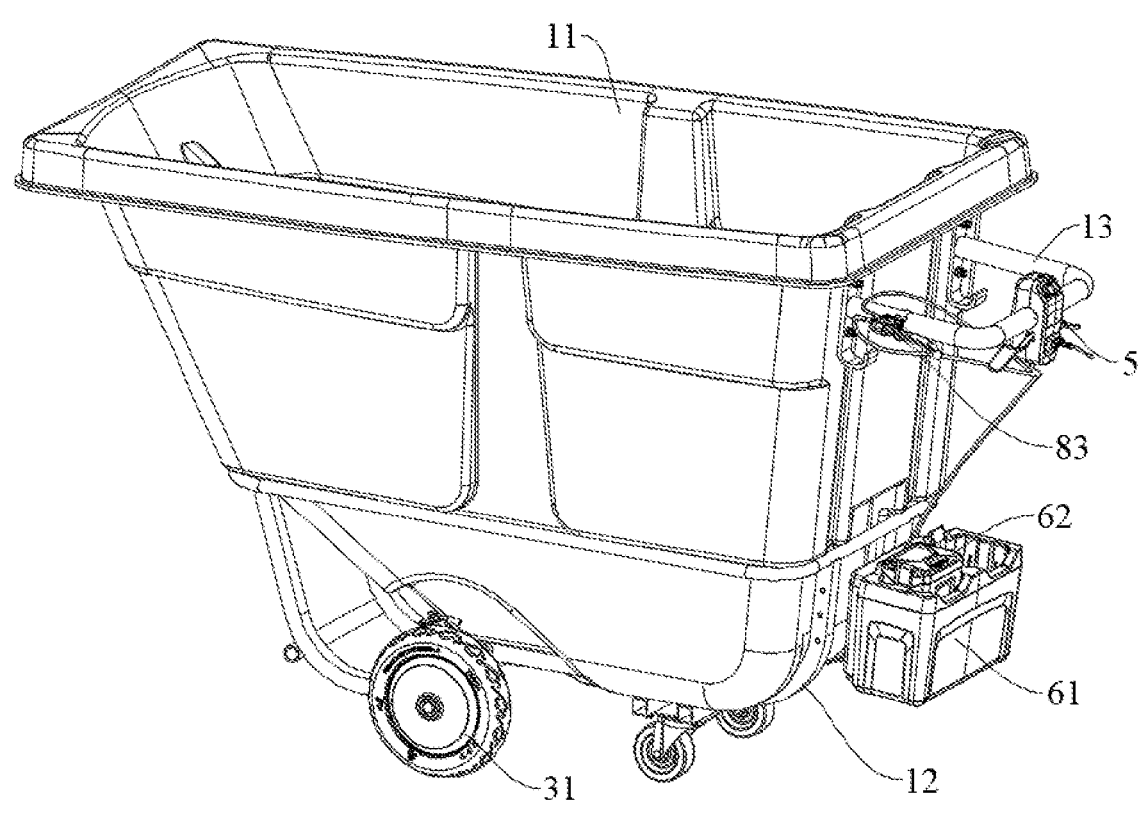
FIG. 31 is a schematic structural view of the walk-behind cart from another angle according to at least one embodiment.
Figure 32:
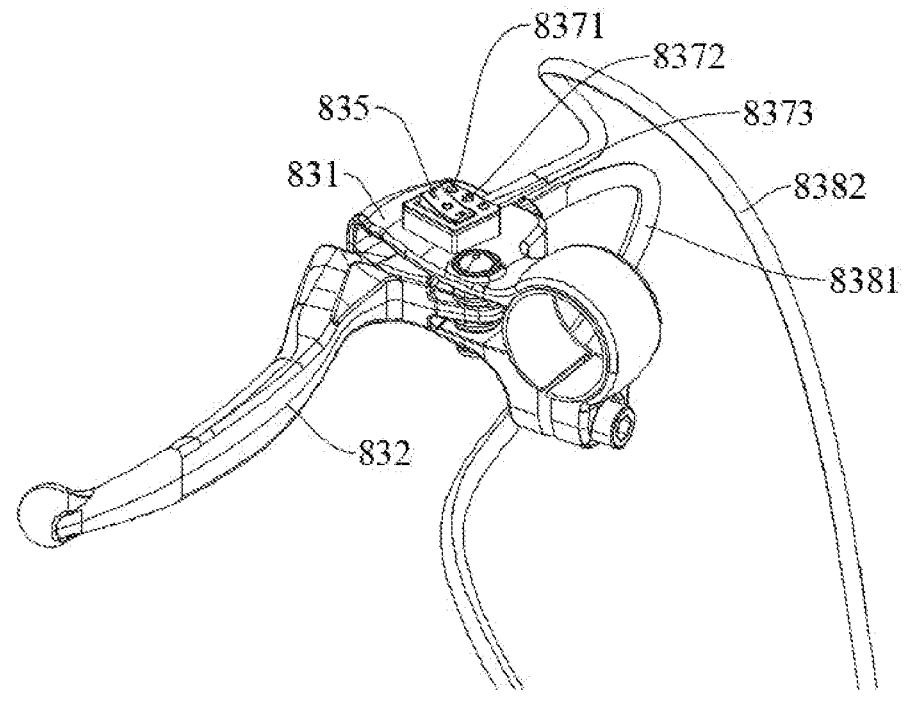
FIG. 32 is a schematic structural view of the control assembly in the walk-behind cart according to at least one embodiment.
Figure 33:
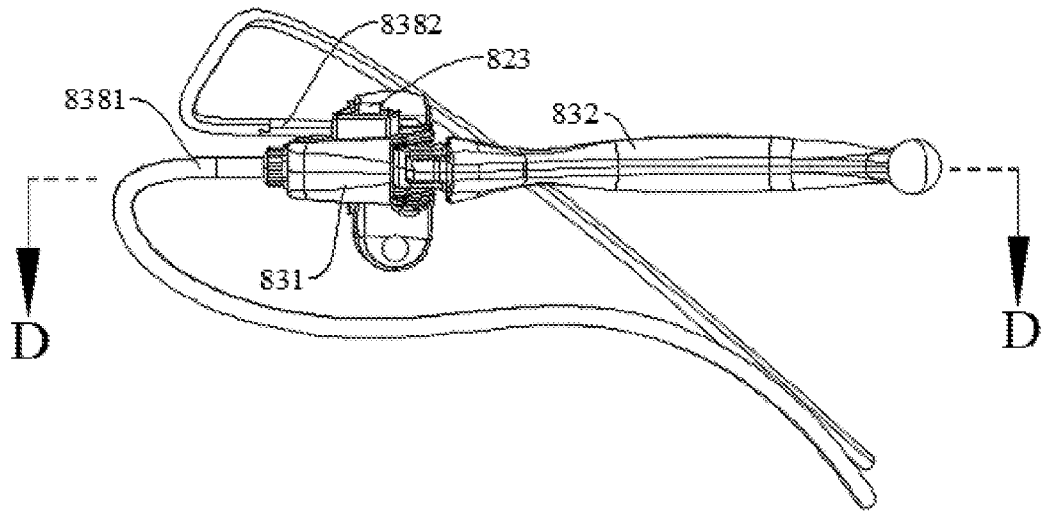
FIG. 33 is a front view of the control assembly in the walk-behind cart according to at least one embodiment.
Figure 34:
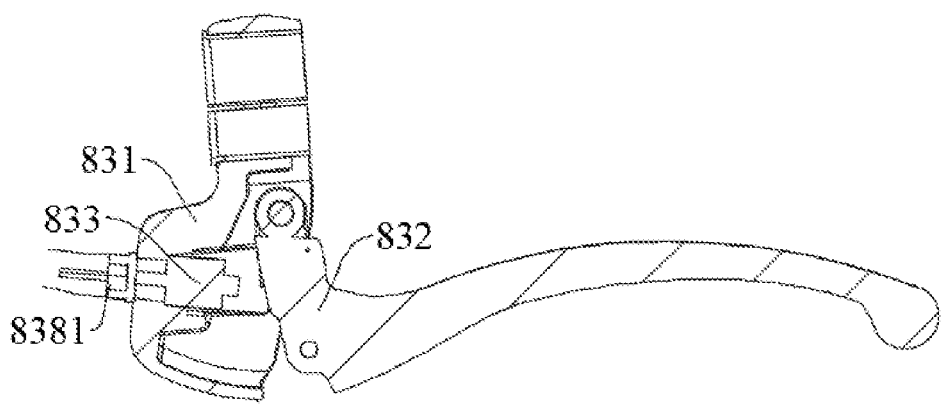
FIG. 34 is a schematic structural view of a cross-section along D-D in FIG. 33.
Figure 35:
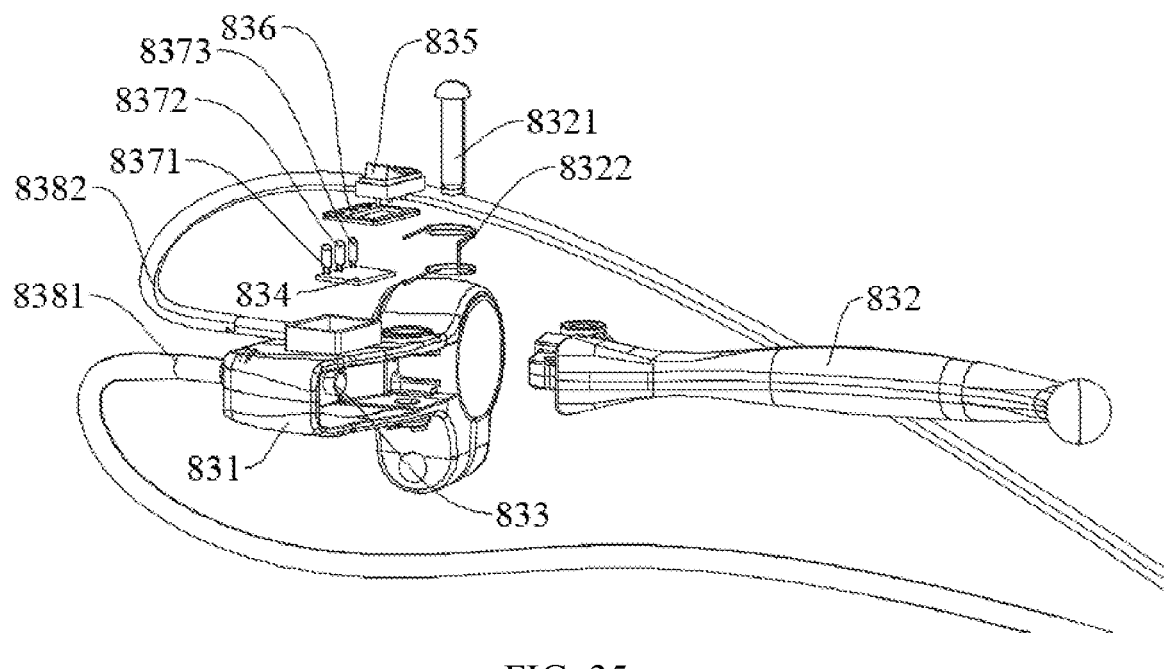
FIG. 35 is a schematic exploded view of the control assembly in the walk-behind cart according to at least one embodiment.
Figure 36:
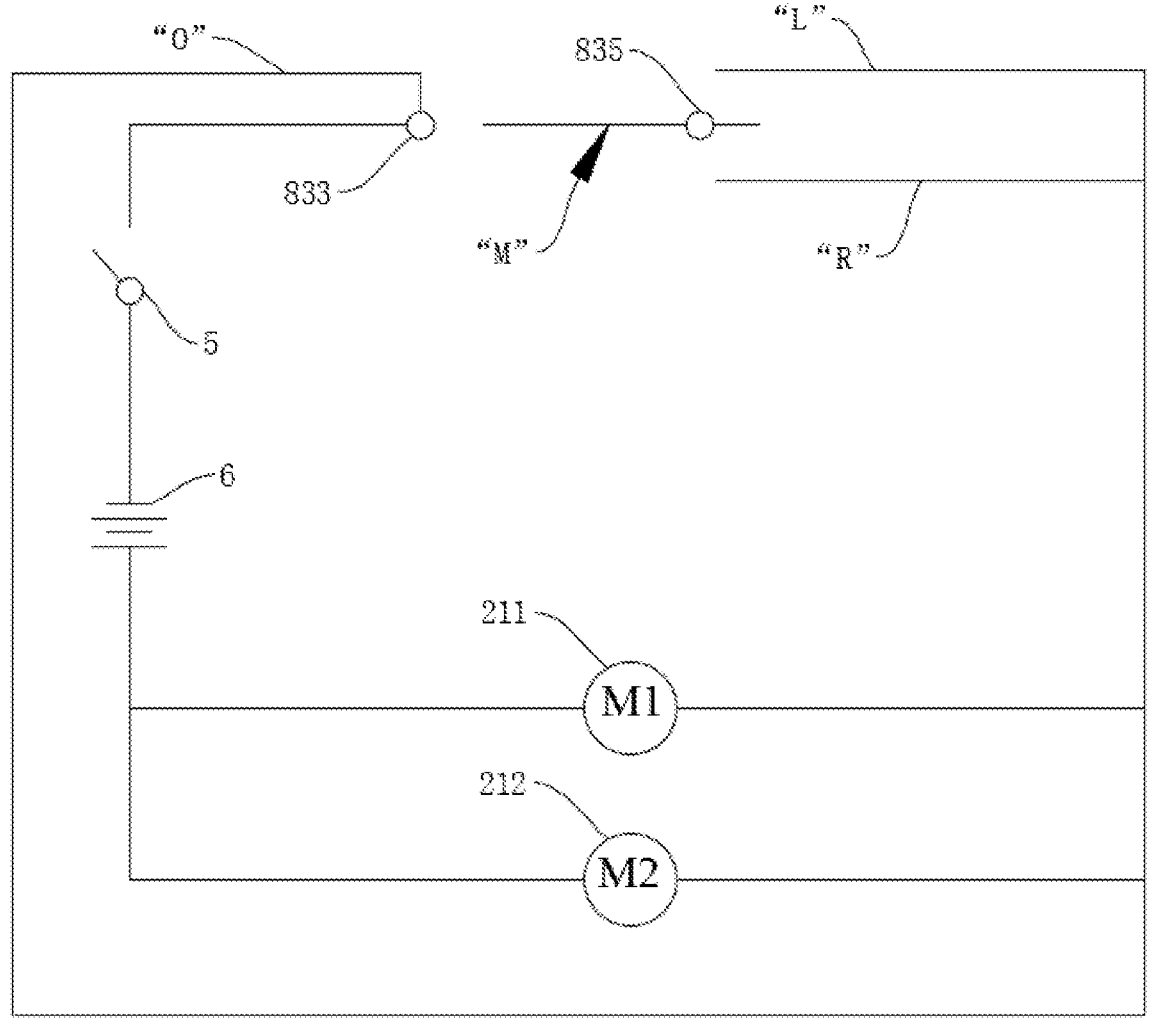
FIG. 36 is a schematic view of a circuit when the walk-behind cart moving forward according to at least one embodiment.

Please refer to FIG. 30, FIG. 35 and FIG. 36. In this embodiment, the steering switch 835 is set as a boat-shaped switch, the boat-shaped switch is provided with three different marks: "L", "0" and "R", respectively correspond to the three different gear lines set in the control panel 834: the left turn gear "L", the middle gear "0" and the right turn gear "R". The mark "L" and mark "R" are located at two sides of the boat-shaped switch, and the mark "0" is located at a middle position of the boat-shaped switch. In this embodiment, after the power supply device provides a power source for the walk-behind cart, in an initial state, the steering switch 835 is located at a position of the mark "0", the steering handle 832 presses the main switch 833 under an elastic force of the fourth return spring 8322, so that the main switch 833 is in a state of being pressed. A signal is transmitted to the control assembly 5 through the first signal line 8381, and at this time, the main switch 833 is turned on with the "0" line and transmits signals to the control assembly 5 through a second signal line 8382. The remaining "L" lines of the left turn gear and the "R" line of the right turn gear are all disconnected. At this moment, the control switch on the control assembly 5 is pressed and held, the first hub motor 211 and the second hub motor 212 are started, and rotating directions of the first hub motor 211 and the second hub motor 212 are the same, so that the walk-behind cart runs along a straight line normally, and the control switch on the control assembly 5 is loosened, then the first hub motor 211 and the second hub motor 212 are turned off, and the walk-behind cart stops running.

Figure 37:
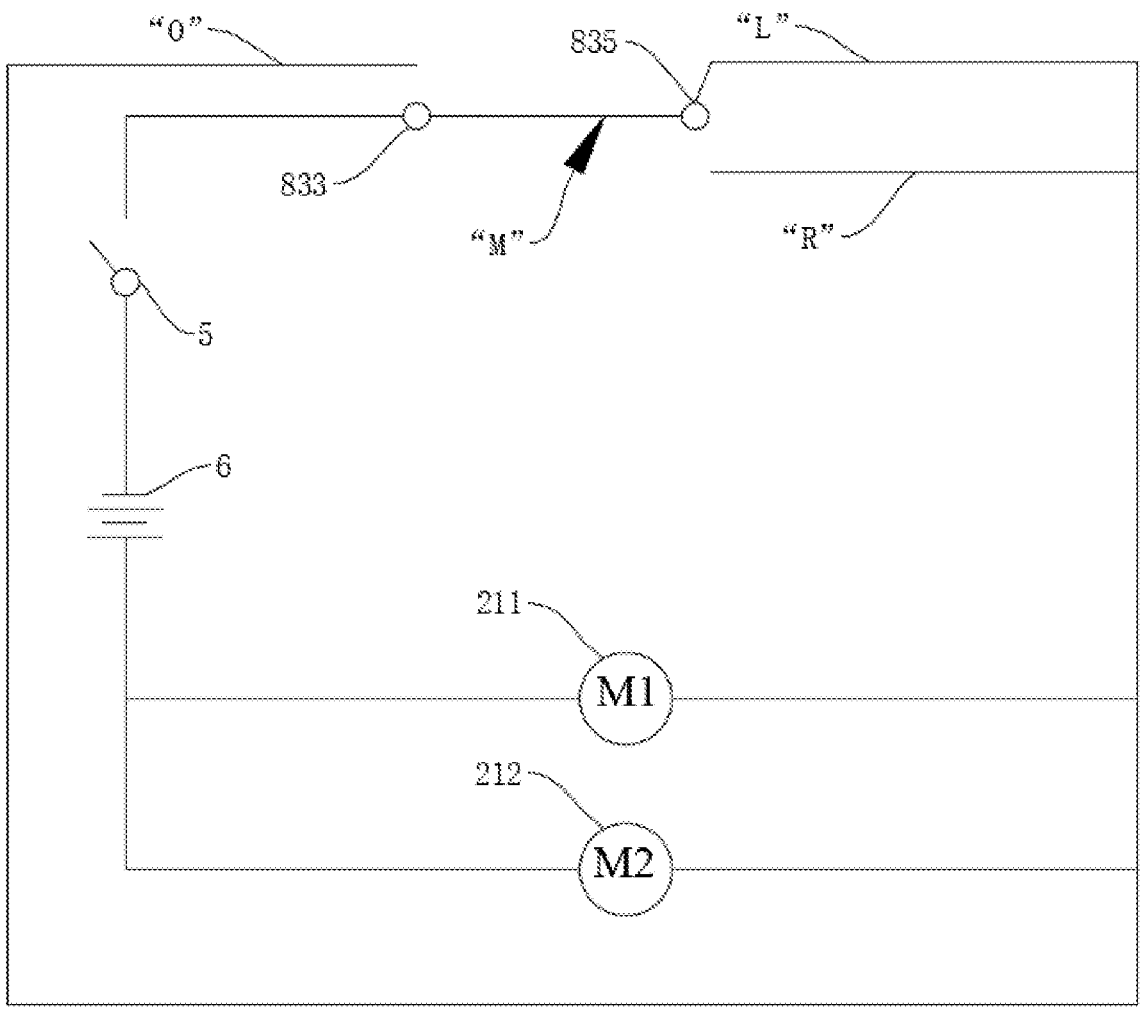
FIG. 37 is a schematic view of a circuit when the walk-behind cart turning left according to at least one embodiment.

Please refer to FIG. 30, FIG. 35 and FIG. 37. In this embodiment, through pressing the steering handle 832, the steering handle 832 rotates around the third rotating shaft 8321 so as to be away from the main switch 833, so that the main switch 833 is not pressed, a signal is transmitted to the control assembly 5 through the first signal line 8381 at this time, and the main switch 833 is turned on with the line "M" of the boat-shaped switch. Through adjusting the boat-shaped switch to a position of the mark "L", the corresponding first indication light 8371 lights up at this moment to remind the user. At this moment the signal is transmitted to the control assembly 5 by the second signal line 8382, the boat-shaped switch is connected with the "L" line of the left turn gear. The control switch on the control assembly 5 is pressed and held at this moment, the first hub motor 211 rotates forward at a uniform set speed, and the second hub motor 212 then rotates at a same uniform speed in an opposite direction with the first hub motor 211, which achieves a purpose of turning left in situ of the walk-behind cart. The control switch on the control assembly 5 is loosened when adjusting to a required steering angle, then the first hub motor 211 and the second hub motor 212 are turned off, and the walk-behind cart stops running.

Figure 38:
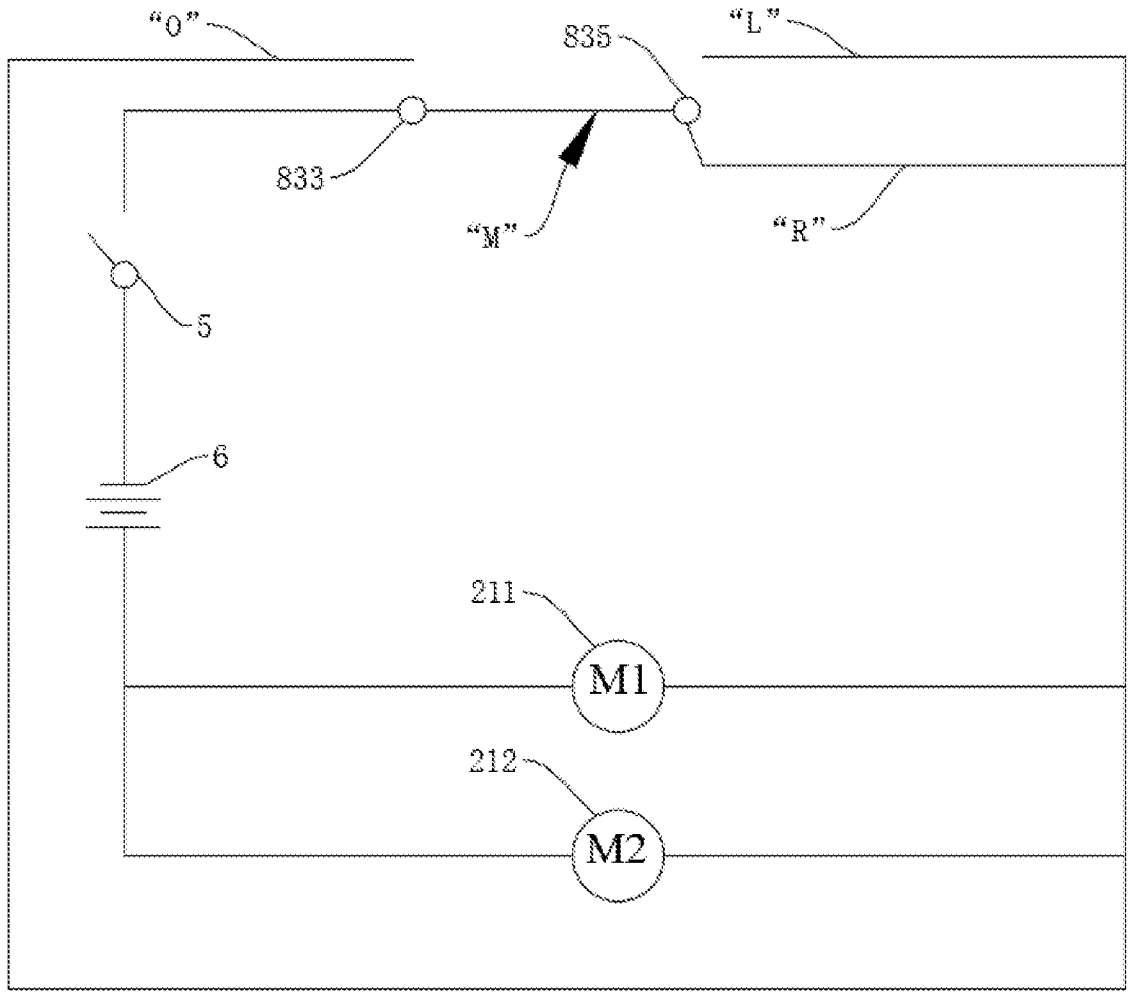
FIG. 38 is a schematic view of a circuit when the walk-behind cart turning right according to at least one embodiment.

Please refer to FIG. 30, FIG. 35 and FIG. 38. In this embodiment, through pressing the steering handle 832, the steering handle 832 rotates around the third rotating shaft 8321 so as to be away from the main switch 833, so that the main switch 833 is not pressed, a signal is transmitted to the control assembly 5 through the first signal line 8381 at this time, and the main switch 833 is turned on with the line "M" of the boat-shaped switch. Through adjusting the boat-shaped switch to a position of the mark "R", the corresponding third indication light 8373 lights up at this moment to remind the user. At this moment the signal is transmitted to the control assembly 5 by the second signal line 8382, the boat-shaped switch is connected with the "R" line of the right turn gear. The control switch on the control assembly 5 is pressed and held at this moment, the second hub motor 212 rotates forward at a uniform set speed, and the first hub motor 211 then rotates at a same uniform speed in an opposite direction with the second hub motor 212, which achieves a purpose of turning right in situ of the walk-behind cart. The control switch on the control assembly 5 is loosened when adjusting to a required steering angle, then the first hub motor 211 and the second hub motor 212 are turned off, and the walk-behind cart stops running.

Please refer to FIG. 30 through FIG. 38. It should be noted that when the control switch on the control assembly 5 is pressed and held and the walk-behind cart suddenly needs to steer in a driving process of a normal operation state, the boat-shaped switch is pressed to the left turn gear "L" or the right turn gear "R". The steering handle 832 is pressed with hands, at this time, the control assembly 5 runs a setting program first, which enables the first hub motor 211 and the second hub motor 212 to power off and stop running, and when the walk-behind cart is completely stopped, then a steering function is performed to protect the hub motor from damage.

The walk-behind cart of the disclosure which is free turning controls the steering of the first hub motor and the second hub motor at the bottom of the frame respectively through the control assembly. When the first hub motor and the second hub motor rotate in the same direction, the walk-behind cart is in a forward or backward state. When the first hub motor and the second hub motor rotate in opposite directions, the walk-behind cart is in a left turn or right turn state, and the rotating speed of the first hub motor and the second hub motor are the same. When the walk-behind cart needs to be steered, the first hub motor and the second hub motor are controlled by the control assembly to rotate in the opposite directions at the same speed, so that the walk-behind cart achieves a purpose of turning in situ, which avoid that when the walk-behind cart is loaded with heavy objects, it is necessary to push with great force. This is easy to enable the user to feel tired. And in a relatively narrow space, manpower is relied to exert a lateral force to push the walk-behind cart to steer, a strength is sometimes inaccurate, the walk-behind cart cannot smoothly turn to the required angle, and a problem of time-consuming and labor-consuming needed to be repeatedly adjusted is avoided, which enables the steering of the walk-behind cart to be convenient and labor-saving, and enables the walk-behind cart to quickly and conveniently realize the steering function under a condition of the narrow space or full of heavy objects.

The above embodiments only illustrate principles and effects of the disclosure, but are not intended to limit the disclosure. Anyone familiar with this technology may modify or change the above embodiments without departing from a scope of the disclosure. Therefore, all equivalent modifications or changes made by those with ordinary knowledge in the technical field without departing from the technical ideas disclosed in the disclosure shall still be covered by the claims of the disclosure.

What is claimed is:

1. A walk-behind cart, comprising:
a vehicle body assembly;
a driving wheel, connected with the vehicle body assembly through a wheel axle and being capable of rotating around the wheel axle;
a power assembly, mounted in a wheel hub of the driving wheel and driving the driving wheel to rotate;
a braking assembly, partially arranged on the driving wheel for braking the driving wheel;
a control assembly, arranged on the vehicle body assembly and electrically coupled to the power assembly and the braking assembly; and
a power supply device, arranged on the vehicle body assembly and electrically coupled to the power assembly, the braking assembly and the control assembly;
wherein, the control assembly comprises a steering control device, the steering control device is electrically connected with the power assembly in the driving wheel on both sides of the vehicle body assembly and is configured to control a steering of the driving wheel on both sides of the vehicle body assembly, the steering control device comprises a bracket and a steering switch, a control panel is mounted in the bracket, the steering switch is mounted on the bracket and is connected with the control panel, and the steering switch is configured to control the steering of the driving wheels on both sides of the vehicle body assembly;
wherein the steering control device further comprises:
a steering handle, connected with the bracket through a rotating shaft;
a main switch, mounted inside the bracket, connected with the control panel and controlled through the steering handle;
a return spring, sleeved on the rotating shaft; and
a pressing plate, fixedly connected with the bracket to fix the steering switch.

2. The walk-behind cart according to claim 1, wherein the control panel is provided with three different gears which are a left turn gear, a middle gear and a right turn gear, and the three different gears are controlled by the steering switch.

3. The walk-behind cart according to claim 2, wherein the control panel is further provided with at least one indication light, and the indication light is configured to indicate a state of the steering switch.

4. The walk-behind cart according to claim 2, wherein the control panel is further provided with three indication lights corresponding to the three different gears of the left turn gear, the middle gear and the right turn gear.

5. The walk-behind cart according to claim 4, wherein the pressing plate is fixedly connected with the bracket by welding or a buckle to fix the steering switch, and the indication light is mounted on the pressing plate.

6. The walk-behind cart according to claim 1, wherein a control box is further mounted on a frame of the vehicle body assembly, and the control box is electrically connected with the steering control device through a signal line.

7. The walk-behind cart according to claim 1, wherein the power assembly comprises a hub motor, and the hub motor is arranged in the wheel hub of the driving wheel.

8. The walk-behind cart according to claim 1, wherein the braking assembly comprises:

a first driving component, fixedly connected with a frame of the vehicle body assembly;

a braking pad, connected with the first driving component; and an operation assembly, mounted on the frame, and comprising a second driving component and a braking handle, wherein, the second driving component is connected with the first driving component through a hydraulic oil tube, the braking handle is mounted on the second driving component, when braking, the braking handle pushes hydraulic oil in the second driving component to be squeezed into the first driving component along the hydraulic oil tube, thereby pushing the braking pad, so that the braking pad contacts and squeezes a brake disc, and the brake disc is fixedly connected with the wheel hub of the driving wheel.

9. The walk-behind cart according to claim 1, wherein the braking assembly comprises:

a first braking component, fixed at the driving wheel to realize a braking of the driving wheel; and a second braking component, fixed on a handle of the vehicle body assembly, connected with the first braking component through a cable, and electrically connected with a control device through a signal line; wherein when the braking assembly is in a braking state, a control connection between the control device and the power assembly is disconnected.

10. The walk-behind cart according to claim 1, wherein the power supply device comprises:

a battery box, fixed on a handle of the vehicle body assembly;

a battery pack cavity, formed in the battery box;

a battery pack, datachably fixed in the battery pack cavity; and a power cable, electrically connected with the battery pack and hub motors in the power assembly.

11. The walk-behind cart according to claim 1, wherein the vehicle body assembly comprises a frame and a wagon box, the wagon box is fixed on the frame, and the frame comprises:

a supporting bracket, fixed at a bottom of the wagon box and supporting the wagon box; and a fixing frame, fixedly connected with the supporting bracket and configured to mount the driving wheel; wherein wheel axles on both sides of the driving wheel are fixedly connected with the fixing frame.

\* \* \* \* \*